(12) United States Patent
Kornilov et al.

(10) Patent No.: US 10,403,036 B2
(45) Date of Patent: *Sep. 3, 2019

(54) RENDERING GLASSES SHADOWS

(71) Applicant: Ditto Technologies, Inc., San Francisco, CA (US)

(72) Inventors: Dmitry Kornilov, Menlo Park, CA (US); Robert Charlie Daugherty, Seattle, WA (US); Robert Curtis Randolph, Portland, OR (US); Sergey Surkov, Foster City, CA (US)

(73) Assignee: Ditto Technologies, Inc., Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/985,882

(22) Filed: May 22, 2018

(65) Prior Publication Data

US 2018/0374261 A1    Dec. 27, 2018

Related U.S. Application Data

(63) Continuation of application No. 14/603,207, filed on Jan. 22, 2015, now Pat. No. 10,013,796.

(51) Int. Cl.
| | |
|---|---|
| *G06T 15/60* | (2006.01) |
| *G06Q 30/06* | (2012.01) |
| *G06T 17/00* | (2006.01) |
| *G06T 19/00* | (2011.01) |
| *G06K 9/00* | (2006.01) |

(52) U.S. Cl.
CPC ........ *G06T 15/60* (2013.01); *G06K 9/00281* (2013.01); *G06Q 30/0643* (2013.01); *G06T 17/00* (2013.01); *G06T 19/00* (2013.01)

(58) Field of Classification Search
CPC ....... G06T 15/506; G06T 15/50; G06T 15/80; G06T 15/60; G06T 15/06
USPC .......................................................... 345/426
See application file for complete search history.

(56) References Cited

U.S. PATENT DOCUMENTS

| | | | |
|---|---|---|---|
| 6,556,196 B1 * | 4/2003 | Blanz | G06K 9/00275 |
| | | | 345/419 |
| 7,016,824 B2 | 3/2006 | Waupotitsch | |
| 9,076,209 B2 * | 7/2015 | Choukroun | G06T 19/00 |

(Continued)

OTHER PUBLICATIONS

"Background Subtraction" (by OpenCV-Python Tutorials, in 2013).
"Image Processing with Scilab and Image Processing Design Toolbox" (by Eng. Harald Galda, in 2011).

*Primary Examiner* — Gordon G Liu
(74) *Attorney, Agent, or Firm* — Van Pelt, Yi & James LLP

(57) ABSTRACT

Rendering glasses with shadows is disclosed, including: generating a face image corresponding to an image of a set of images based at least in part on a face model, wherein the set of images is associated with a user's face; generating a face with shadows image corresponding to the image based at least in part on shadows casted by a glasses model on the face model; generating a shadow transform based at least in part on a difference determined based at least in part on the face image and the face with shadows image; generating a shadowed image based at least in part on applying the shadow transform to the image; and presenting the shadowed image including by overlaying a glasses image associated with the glasses model over the shadowed image.

16 Claims, 24 Drawing Sheets

(56) References Cited

U.S. PATENT DOCUMENTS

| | | | | |
|---|---|---|---|---|
| 9,578,226 B2* | 2/2017 | Gruber | ............... | H04N 5/23212 |
| 2009/0303199 A1* | 12/2009 | Cho | ................... | G06F 3/04845 |
| | | | | 345/173 |
| 2012/0309520 A1 | 12/2012 | Evertt | | |
| 2012/0313955 A1 | 12/2012 | Choukroun | | |
| 2013/0088490 A1 | 4/2013 | Rasmussen | | |
| 2013/0132843 A1 | 5/2013 | Marnett | | |
| 2014/0177955 A1* | 6/2014 | Srinivasan | ........... | G06K 9/4652 |
| | | | | 382/165 |
| 2015/0279113 A1* | 10/2015 | Knorr | ................... | G06T 19/006 |
| | | | | 345/633 |
| 2016/0035133 A1* | 2/2016 | Ye | ........................ | G06T 19/006 |
| | | | | 345/419 |

* cited by examiner

900
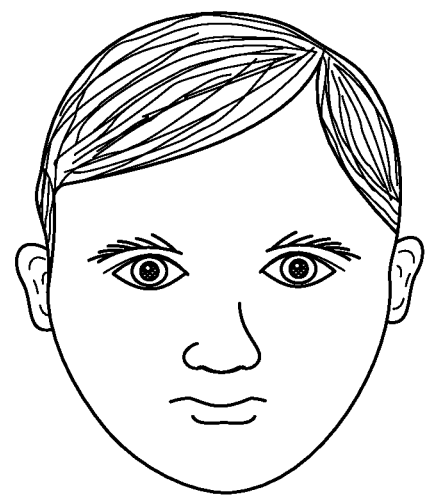
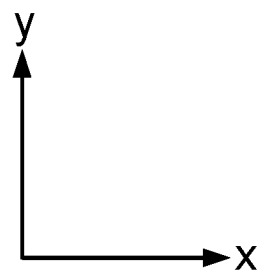
FIG. 9

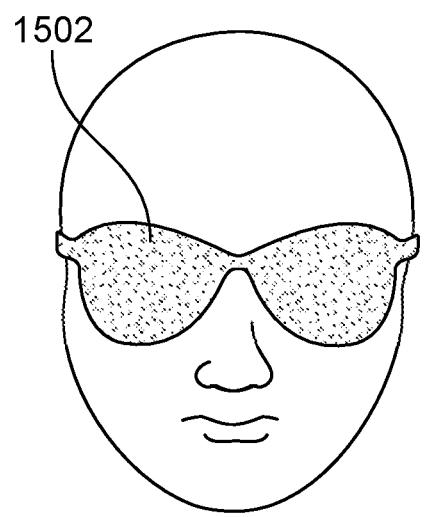
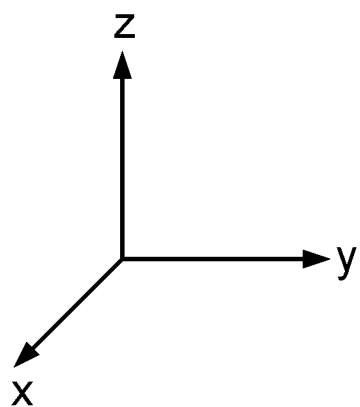
FIG. 15

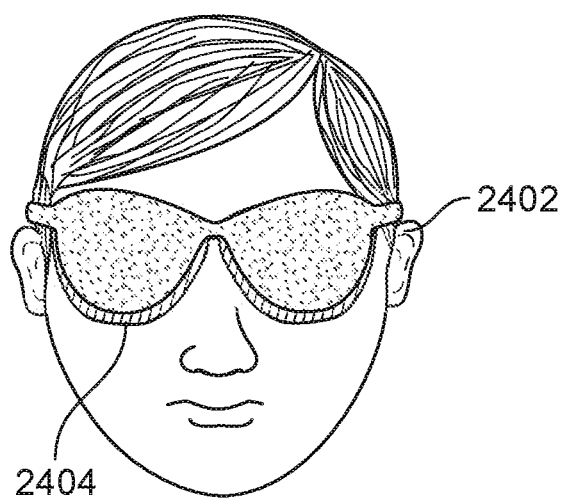
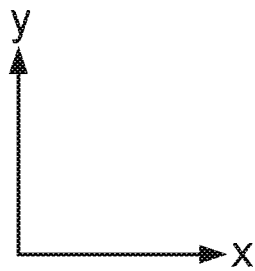
FIG. 24

RENDERING GLASSES SHADOWS

CROSS REFERENCE TO OTHER APPLICATIONS

This application is a continuation of co-pending U.S. patent application Ser. No. 14/603,207 entitled RENDERING GLASSES SHADOWS filed Jan. 22, 2015 which is incorporated herein by reference for all purposes.

BACKGROUND OF THE INVENTION

Conventionally, in a virtual try-on of an item, such as a virtual pair of glasses displayed on a recorded image of a person's face, if the shadows casted by the glasses are not visible on the person's face, then the effect of the try-on is missing an important element of realism. Typically, a shadow on an image can be generated using ray tracing. To generate a shadow of an object (e.g., a virtual pair of glasses) on a person's face, an exact model of the person's face, including a texture that represents the person's face, may need to be generated before ray tracing can be performed. However, not only is generating such a detailed model of the person's face time consuming, the process of ray tracing a shadow onto the exact model is also very laborious and inefficient.

BRIEF DESCRIPTION OF THE DRAWINGS

Various embodiments of the invention are disclosed in the following detailed description and the accompanying drawings.

FIG. 9 is a diagram showing an example of an image of a user's face.

FIG. 15 is a diagram showing an example of a transformed 3D generic face model combined with a transformed 3D glasses model in 3D space.

FIG. 24 is a diagram showing an example presentation of a shadowed image with a 2D glasses image overlay.

DETAILED DESCRIPTION

Figure 1:
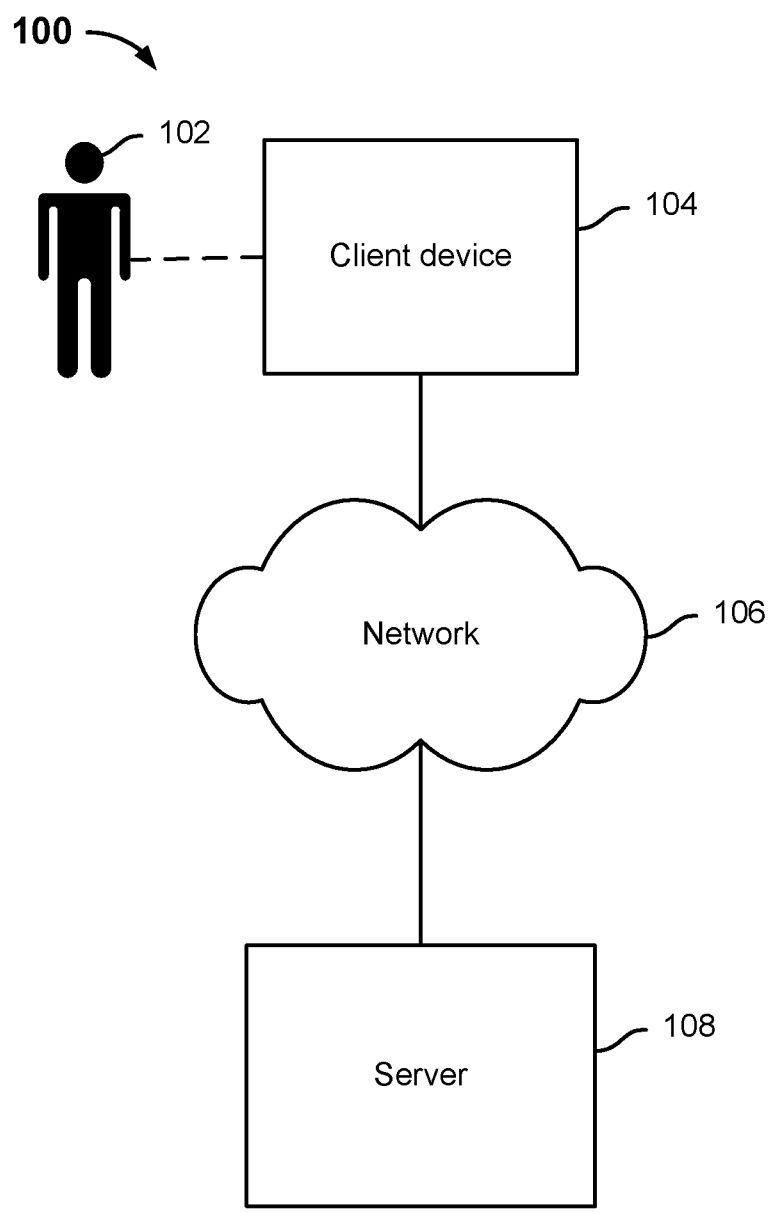
FIG. 1 is a diagram showing an embodiment of a system for rendering glasses shadows.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of rendering glasses shadows are described herein. In various embodiments, a three-dimensional (3D) representation (e.g., model) of a user's face is determined from a set of images of the user's face at various orientations. For example, the set of images may include frames of a video recording of the user moving his or her head from side to side. In various embodiments, a set of extrinsic information is determined for each image of the set of images. In some embodiments, the set of extrinsic information corresponding to an image describes an orientation associated with the user's face in that image. A 3D generic model of a face is obtained (e.g., from storage). In various embodiments, the 3D generic model comprises a greyscale 3D model of a generic user's face. In various embodiments, the 3D generic model is morphed to match the 3D model of the user's face. In various embodiments, for each image of the set of images associated with the user's face, the morphed 3D generic model can be transformed with the set of extrinsic information associated with that particular image to generate a two-dimensional (2D) face image corresponding to that image. In various embodiments, for each image of the set of images associated with the user's face, the morphed 3D generic model transformed with the set of extrinsic information associated with that particular image is fitted with a 3D glasses model that is also transformed with the set of extrinsic information associated with that particular image and a shadow casted by the transformed 3D glasses model onto the transformed generic 3D model is simulated with a given lighting model. In some embodiments, the lighting model is determined based on the specific lighting environment of the user in the set of images. For example, the 3D glasses model is associated with a pair of glasses that has been selected to be virtually tried on the user's face. In various embodiments, a 2D face with shadows image that includes the shadows casted by the glasses model onto the transformed 3D generic model is generated. In various embodiments, a corresponding shadow transform is generated for each image of the set of images associated with the user's face based at least in part on a difference between each image's corresponding 2D face image and the corresponding 2D face with shadows image. In various embodiments, a shadow transform corresponding to an image of the set of images associated with the user's face can be applied to that image to render/simulate the shadows casted by the selected glasses onto the user's face in that image. The image of the user's face to which a corresponding shadow transform was applied can be presented with an overlay of a 2D image of the selected pair of glasses so as to simulate a virtual try-on of the selected pair of glasses on the user's face, with realistic shadows casted by the selected glasses onto the user's face as simulated using the lighting model that is determined based on the specific lighting environment of the user.

FIG. 1 is a diagram showing an embodiment of a system for rendering glasses shadows. In the example, system 100 includes client device 104, network 106, and server 108. Network 106 includes high speed data networks and/or telecommunications networks. In some embodiments, client device 104 is configured to communicate to server 108 over network 106.

Client device 104 is configured to record or receive a set of recorded images corresponding to a user's face/head at various orientations. Examples of client device 104 may include a laptop computer, a desktop computer, a tablet device, a mobile device, a smart phone and/or any computing device. For example, the set of recorded images may comprise a video or a series of snapshots. In some embodiments, client device 104 includes or is connected to a camera device. The camera device and/or a processor of client device 104 that is running an application can capture a set of images of the user's face as user 102 turns his or her head in different directions (e.g., as instructed through a user interface of the application). In some embodiments, the set of images of a user's face is captured/submitted at a user interface of a website or an application executing at client device 104. In various embodiments, the set of images is sent to server 108 for server 108 to process. For example, server 108 is associated with the website or application through which the set of images is captured. In some embodiments, client device 104 includes a user interface through which the user may interact and view a playback associated with the images. For example, the playback associated with the images may also be presented at the website or in the application.

In various embodiments, server 108 is configured to receive a set of images sent from a client device such as client device 104. Server 108 searches for a (e.g., optimal) representation (e.g., a mathematical 3D model) of the user's (e.g., user 102) face associated with a set of images and also (e.g., optimal) sets of extrinsic information corresponding to respective images of the set (e.g., a set of extrinsic information is specifically determined for each image of the set).

Server 108 is configured to obtain (e.g., from storage) a 3D generic face model. For example, the 3D generic face model was determined by averaging previously generated 3D models of users' faces. In some embodiments, the 3D generic face model may be configured by an administrator. In some embodiments, server 108 is configured to perform a 3D reconstruction process to generate a 3D generic face model from a set of images. In some embodiments, the 3D generic face model comprises a greyscale surface.

In various embodiments, server 108 is configured to morph the 3D generic face model to match the 3D model of the user 102's face. For example, in the morphed 3D generic face model, at least certain portions of the 3D generic face model have been moved to match corresponding portions of the 3D model of user 102's face in 3D space. Server 108 is configured to use the set of extrinsic information corresponding to each image to orient the morphed 3D generic face model to correspond to the orientation of the user's face in that image. Then, server 108 is configured to project the oriented morphed 3D generic face model onto a 2D surface of the focal plane of a camera using a set of intrinsic information associated with the camera to obtain a 2D generic face image corresponding to that image of the set of images. As such, a corresponding 2D generic face image can be generated corresponding to each image of the set of images.

Server 108 is configured to receive a selection of a pair of glasses. For example, the pair of glasses is selected to be tried onto the user's face of the set of images. Server 108 obtains a 3D model of the selected pair of glasses (e.g., from storage). Server 108 is configured to use the set of extrinsic information corresponding to each image to orient the 3D glasses model to correspond to the orientation of the user's face in that image. Server 108 is configured to fit a transformed 3D glasses model corresponding to an image onto the transformed 3D generic face model (that was transformed using the same set of extrinsic information) corresponding to the same image and apply a lighting model to the transformed 3D generic face model fitted with the transformed 3D glasses model to obtain shadows casted by the transformed 3D glasses model onto the transformed 3D generic face model. In some embodiments, the lighting model is determined based on the lighting environment of the user as depicted in the set of images. Then, server 108 is configured to project the transformed 3D generic face model with the shadows casted by the transformed 3D glasses model onto a 2D surface of the focal plane of a camera using a set of intrinsic information associated with the camera to obtain a 2D generic face with shadows image corresponding to that image of the set of images. As such, a corresponding 2D generic face with shadows image can be generated corresponding to each image of the set of images.

In various embodiments, server 108 is configured to determine a difference image corresponding to each image of the set of images corresponding to a user's face/head between the 2D generic face with shadows image and the 2D generic face image corresponding to that image. As will be described in further detail below, each difference image can be further processed and applied as a "shadow transform" to a corresponding image of the set of images of a user's face/head. Each image of the set of images corresponding to a user's face/head to which the shadow transform has been applied is referred to as a "shadowed image" in various embodiments. Each "shadowed image" comprises the original image of the user's face rendered with the corresponding shadow transform processed from the 3D generic face model. Server 108 is configured to present at least some of the shadowed images corresponding to respective ones of the set of images corresponding to a user's face/head at a user interface, including overlaying a corresponding 2D image of the selected pair of glasses over each shadowed image to emulate a virtual experience of trying on the selected pair of glasses for the user, including presenting the rendered shadows as casted by the glasses in each displayed image to provide a realistic appearance of a glasses being worn on a face.

In some embodiments, enhancing the recorded set of images as described above may also be performed, at least in part, locally at client device 104. For example, server 108 can send computer code to client device 104 that client device 104 can use to perform at least a portion of the glasses shadows rendering as described herein.

Figure 2:
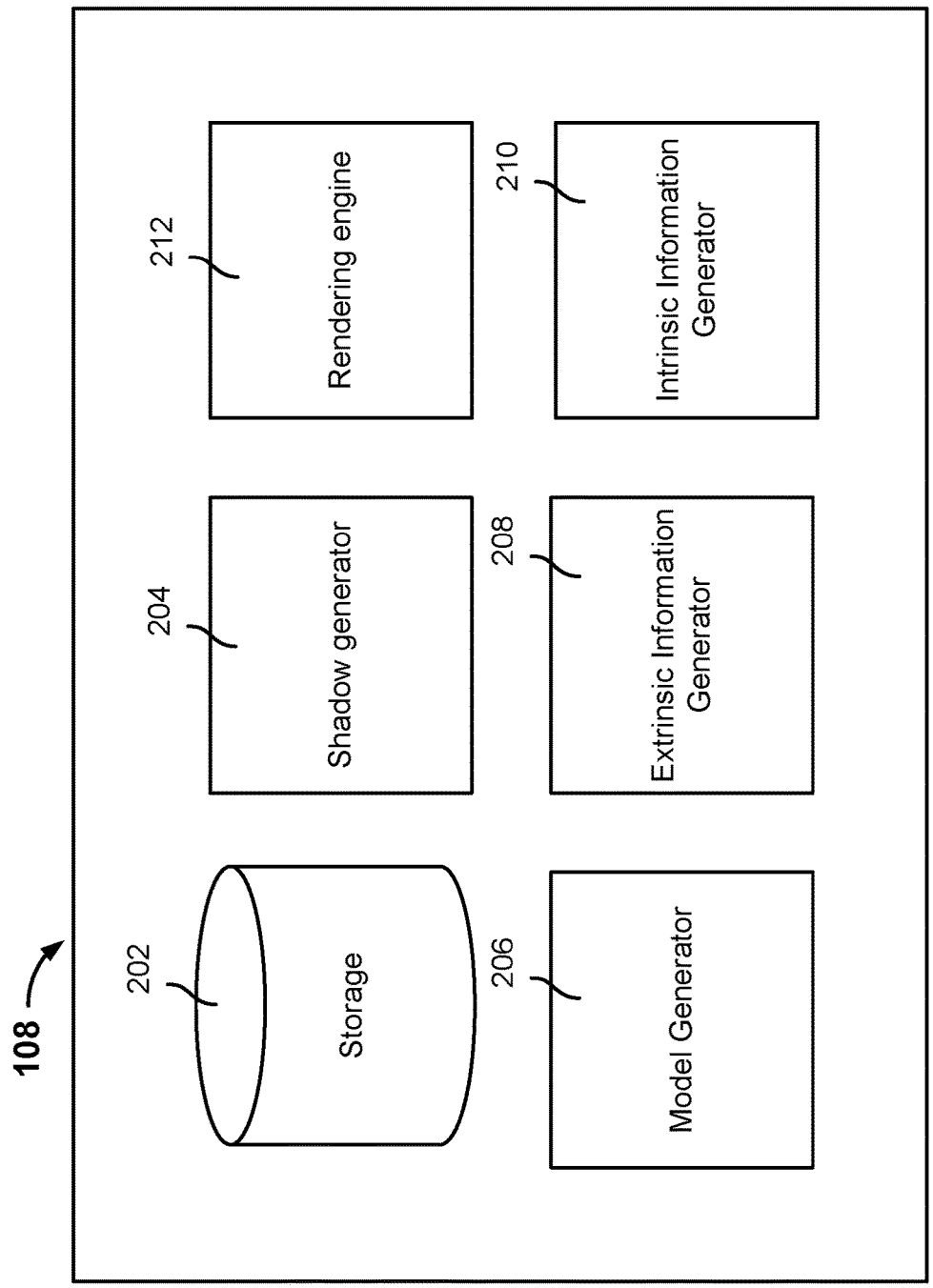
FIG. 2 is a diagram showing an embodiment of a server.

FIG. 2 is a diagram showing an embodiment of a server. In some embodiments, server 108 of system 100 of FIG. 1 is implemented using the example of FIG. 2. In the example, the server includes storage 202, shadow generator 204, model generator 206, extrinsic information generator 208, intrinsic information generator 210, and rendering engine 212. The server may be implemented with additional, different, and/or fewer components than those shown in the example. Each of shadow generator 204, model generator 206, extrinsic information generator 208, intrinsic information generator 210, and rendering engine 212 may be implemented using hardware and/or software.

Storage 202 is configured to store data. In some embodiments, storage 202 stores one or more sets of images and any associated data. For example, each set of images is associated with a video or a series of snapshots of various orientations of a user's face/head. In some embodiments, storage 202 stores one or more 3D generic face models. In some embodiments, a 3D generic face model comprises a greyscale model of a generic user face. In some embodiments, a 3D generic face model is generated based on the face models of previous users of the system and/or a predetermined generic model.

In some embodiments, storage 202 stores one or more 3D glasses models. In some embodiments, each 3D glasses model is associated with a pair of glasses for which a user can select to virtually try on. In some embodiments, storage 202 also stores glasses frame information of each 3D glasses model. For example, the glasses frame information of each 3D glasses model comprises the dimensions of the glasses, attributes of the lenses of the glasses (e.g., whether the lenses comprise a particular color), the manufacturer of the glasses, and the price of the glasses. In some embodiments, storage 202 also stores 2D images of each of one or more 3D glasses models that have been oriented (transformed) to correspond to an orientation of a user's face in a set of images.

In some embodiments, storage 202 stores 2D generic face images of the 3D generic face model that have been oriented (transformed) to correspond to the orientations of a user's face in a set of images. In some embodiments, storage 202 stores 2D generic face images with shadows images of a 3D generic face model that has been oriented (transformed) to correspond to the orientations of a user's face in a set of images and also have had shadows of a 3D glasses model casted onto the 3D generic face model. In some embodiments, storage 202 stores a shadow transform that corresponds to each image in a set of images of a user's face that is determined based on a difference between a 2D generic face image corresponding to that image and a 2D generic face with shadows image corresponding to that image. In some embodiments, storage 202 stores a shadowed image corresponding to each image in a set of images of a user's face that is determined based on applying the shadow transform corresponding to the image to the image.

Model generator 206 is configured to determine a mathematical 3D model for a user's face associated with each set of images of a user's face. For example, the mathematical 3D model of the user's face (i.e., the mathematical model of the user's face in 3D space) may be set at the origin. In some embodiments, the mathematical 3D model determined for a user's face is referred to as an M matrix. In some embodiments, the M matrix may be determined based on a set of reference points associated with features on the user's face from the associated set of images. Examples of reference points include endpoints of the user's eye, bridge of the user's nose, and tip of the user's nose. In some embodiments, model generator 206 is configured to store the M matrix determined for a set of images with the set at storage 202.

Extrinsic information generator 208 is configured to determine a set of extrinsic information for each of at least a subset of a set of images of a user's face. For example, the set of images may be stored at storage 202. In various embodiments, a set of extrinsic information corresponding to an image of a set of images describes one of more of the orientation, rotation, and translation of the 3D model of the user's face needed to result in the correct appearance of the user's face in that particular image. In some embodiments, the set of extrinsic information determined for an image of a set of images associated with a user's face is referred to as an (R, t) pair where R is a rotation matrix and t is a translation vector corresponding to that image. In some embodiments, extrinsic information generator 208 is configured to store the (R, t) pair determined for each of at least a subset of a set of images with the set at storage 202.

Intrinsic information generator 210 is configured to generate a set of intrinsic information for a camera associated with recording a set of images of a user's face. For example, the camera was used to record a set of images stored at storage 202. In various embodiments, a set of intrinsic information corresponding to a camera describes a set of parameters associated with the camera. For example, a parameter associated with a camera comprises a focal length and a principal point of the camera sensor. In some embodiments, the set of intrinsic information associated with a camera is found by taking multiple pictures under various angles of an object with known points and solving an optimization problem treating camera intrinsics and extrinsics as variables, and the model as a constant. In some embodiments, the set of intrinsic information associated with a camera is referred to as an I matrix. In some embodiments, for many practical uses, including rendering glasses shadows onto images made on laptops or mobile phones, the intrinsic information determined for the camera can be assumed to be the same across all devices. In some embodiments, intrinsic information generator 210 is configured to store an I matrix determined for the camera associated with a set of images with the set at storage 202.

Shadow generator 204 is configured to morph a 3D generic face model to match a 3D model of a user's face determined from a set of images of a user's face. In some embodiments, the modified 3D generic face model corresponding to the user's face is referred to as the M' matrix. In some embodiments, the shadow generator 204 morphs the 3D generic face model by moving certain points of the 3D generic face model to match corresponding locations on the 3D model of the user's face. Shadow generator 204 is configured to generate a shadow transform corresponding to each image from a set of images of a user's face based on first generating at least two 2D images from the modified 3D generic face model that was morphed to match the 3D model of the user's face. In various embodiments, to generate a first image of these at least two images corresponding to an image of the user's face (e.g., stored at storage 202), shadow generator 204 is configured to transform the modified 3D generic face model using an (R, t) pair (extrinsic information) corresponding to that image and project the transformed 3D generic face model onto the 2D surface of the focal plane of the camera to obtain the 2D generic face image corresponding to that image. In other words, I×(R× M'+t) results in the projection of the modified 3D generic face model, the M' matrix, in the orientation and translation transformed by the (R, t) pair corresponding to an image of a user's face, onto a 2D surface. The projection onto the 2D surface is the view of the transformed 3D generic face model as seen from the camera. In some embodiments, a 2D generic face image comprises a greyscale image. In some embodiments, the 2D generic face image comprises an image file (e.g., a .png, a .jpeg, etc.). In some embodiments, the 2D generic face image comprises a matrix with greyscale pixel values corresponding to the pixels of the 2D image. In various embodiments, to generate a second image of these at least two images corresponding to the same image of the user's face (e.g., stored at storage 202), shadow generator 204 is configured to transform a 3D model of a selected pair of glasses using the (R, t) pair (extrinsic information) corresponding to that image and combine the transformed 3D glasses model with the transformed 3D generic face model. In some embodiments, combining the transformed 3D glasses model with the transformed 3D generic face model comprises placing/fitting the transformed 3D glasses model onto the transformed 3D generic face model. Shadow generator 204 is then configured to apply a lighting model to the combination of the transformed 3D generic face model and the transformed 3D glasses model to create the shadows casted by the transformed 3D glasses model onto the transformed 3D generic face model. Shadow generator 204 then projects the transformed 3D generic face model with the shadows casted by the 3D glasses model onto the 2D surface of the focal plane of the camera to obtain the 2D generic face with shadows image corresponding to that image of the user's face. The projection onto the 2D surface is the view of the transformed 3D generic face model with the shadows of the transformed 3D glasses model as seen from the camera. In some embodiments, a 2D face with shadows image comprises a greyscale image or non-greyscale image. In some embodiments, the 2D face with shadows image comprises an image file (e.g., a .png, a .jpeg, etc.). In some embodiments, the 2D generic face with shadows image comprises a matrix with greyscale pixel values corresponding to the pixels of the 2D image. In various embodiments, shadow generator 204 is configured to determine the shadow transform for the image of the user's face based at least in part on the difference between the second image, the 2D generic face with shadows image, and the first image, the 2D generic face image. In some embodiments, a shadow transform comprises a greyscale or non-greyscale image. In some embodiments, the shadow transform comprises an image file (e.g., a .png, a .jpeg, etc.).

Shadow generator 204 is configured to apply a determined shadow transform to each image of the at least subset of the set of images of the user's face to generate a corresponding shadowed image. Shadow generator 204 is configured to apply a shadow transform to each (original) image of the user's face by multiplying the original image of the user's face by the shadow transform. For example, modifying each original image using the corresponding shadow transform includes multiplying each channel (e.g., Red, Green, and Blue) value of each pixel of the original image with the corresponding value from the corresponding pixel of the shadow transform.

Rendering engine 212 is configured to display at least some shadowed images at a user interface. In some embodiments, rendering engine 212 is configured to display a corresponding 2D image of the selected pair of glasses overlaid over each of at least some of the shadowed images to provide the user the experience of virtually trying on the selected pair of glasses and with realistic shadows casted onto the user's face by the selected pair of glasses in each played back image.

Figure 3:
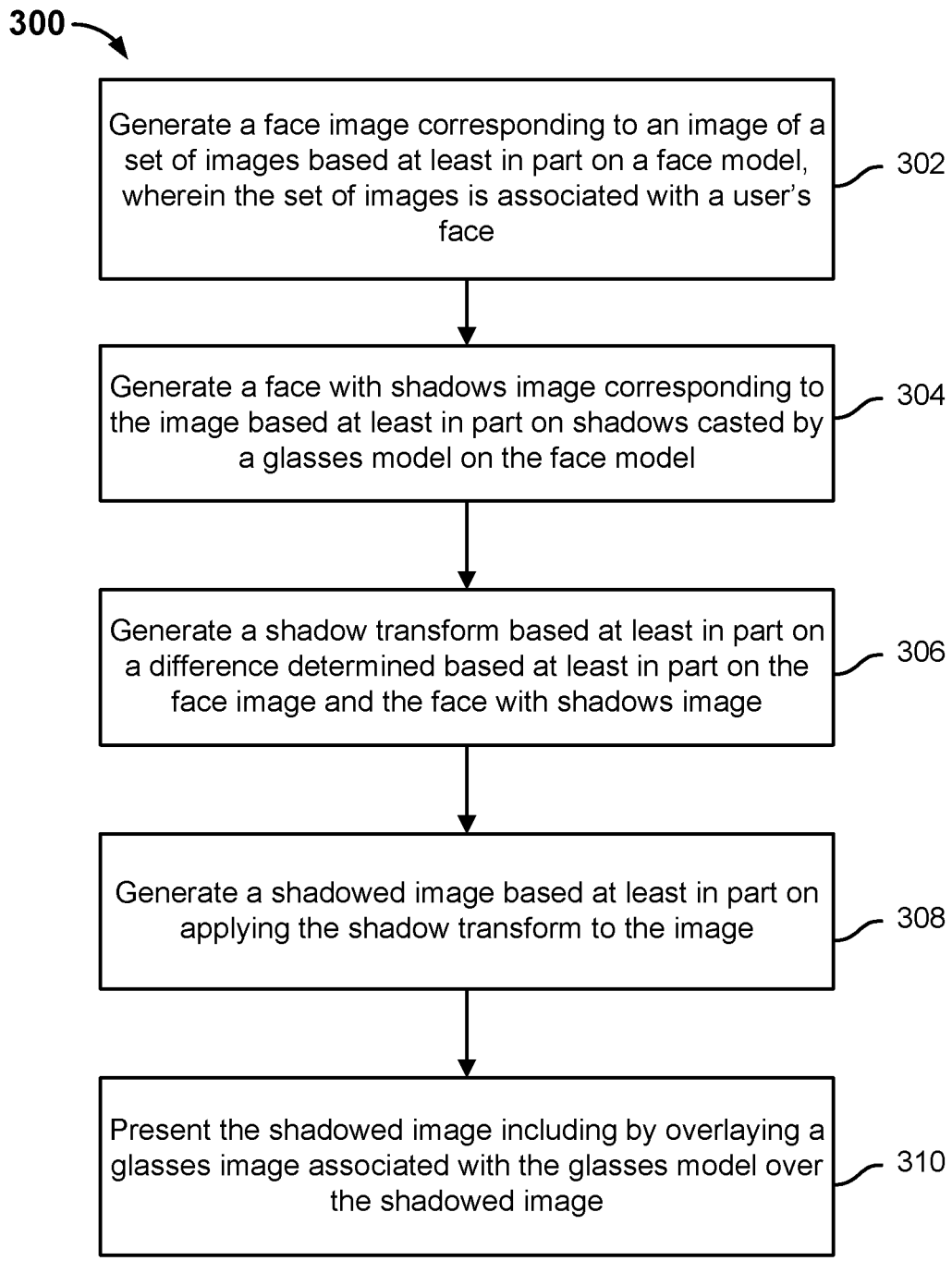
FIG. 3 is a flow diagram showing an embodiment of a process for rendering glasses shadows.

FIG. 3 is a flow diagram showing an embodiment of a process for rendering glasses shadows. In some embodiments, process 300 is implemented at system 100 of FIG. 1.

At 302, a face image corresponding to an image of a set of images is generated based at least in part on a face model, wherein the set of images is associated with a user's face. A first 2D image is generated corresponding to an image of the user's face based on a 3D generic face model. In some embodiments, the 3D generic face model has been morphed to match a 3D model of the user's face that was determined from the set of images of the user's face. In some embodiments, a corresponding set of extrinsic information that describes the orientation of the user's face in that particular image is determined. In various embodiments, prior to generating the 2D generic face image from the modified 3D generic face model, the modified 3D generic face model is transformed by the set of extrinsic information corresponding to that particular image.

At 304, a face with shadows image corresponding to the image is generated based at least in part on shadows casted by a glasses model on the face model. A second 2D image is generated corresponding to the image of the user's face based on the shadows casted by a 3D glasses model onto the 3D generic face model. In some embodiments, prior to generating the 2D generic face with shadows image from the modified 3D generic face model, the modified 3D generic face model is transformed by the set of extrinsic information corresponding to the image and also combined with a 3D glasses model (e.g., corresponding to a selected pair of glasses). A lighting model is applied to the combination of the transformed 3D generic face model and the transformed 3D glasses model to simulate the shadows casted by the 3D glasses model onto the 3D generic face model. In various embodiments, the lighting model emulates the light that is shone onto the user's face in the set of images. In some embodiments, the lighting model is derived from the set of images. For example, the casted shadows may include the shadows caused by the lenses of the glasses and/or the frame of the glasses.

At 306, a shadow transform is generated based at least in part on a difference determined based at least in part on the face image and the face with shadows image. The shadow transform corresponding to the image of the user's face is determined based at least in part on the difference image determined by subtracting the first image, the face image, from the second image, the face with shadows image. In some embodiments, the difference image is further processed (e.g., with one or more filters) before it is used as the shadow transform corresponding to the image of the user's face.

At 308, a shadowed image is generated based at least in part on applying the shadow transform to the image. In various embodiments, applying the shadow transform to the image of the user's face includes multiplying the image of the user's face by the shadow transform. The shadowed image comprises the original image of the user's face with the addition of the shadows that were casted by the 3D glasses model onto the modified 3D generic face model that had been transformed to match the orientation of the user's face in that original image.

At 310, the shadowed image is presented including by overlaying a glasses image associated with the glasses model over the shadowed image. The shadowed image is overlaid with a 2D image of the glasses prior to being displayed. In some embodiments, the 2D image of the glasses was determined from projecting the 3D glasses model transformed by the set of extrinsic information corresponding to the image of the user's face onto a 2D surface of the focal plane of a camera using a set of intrinsic information associated with the camera.

Figure 4:
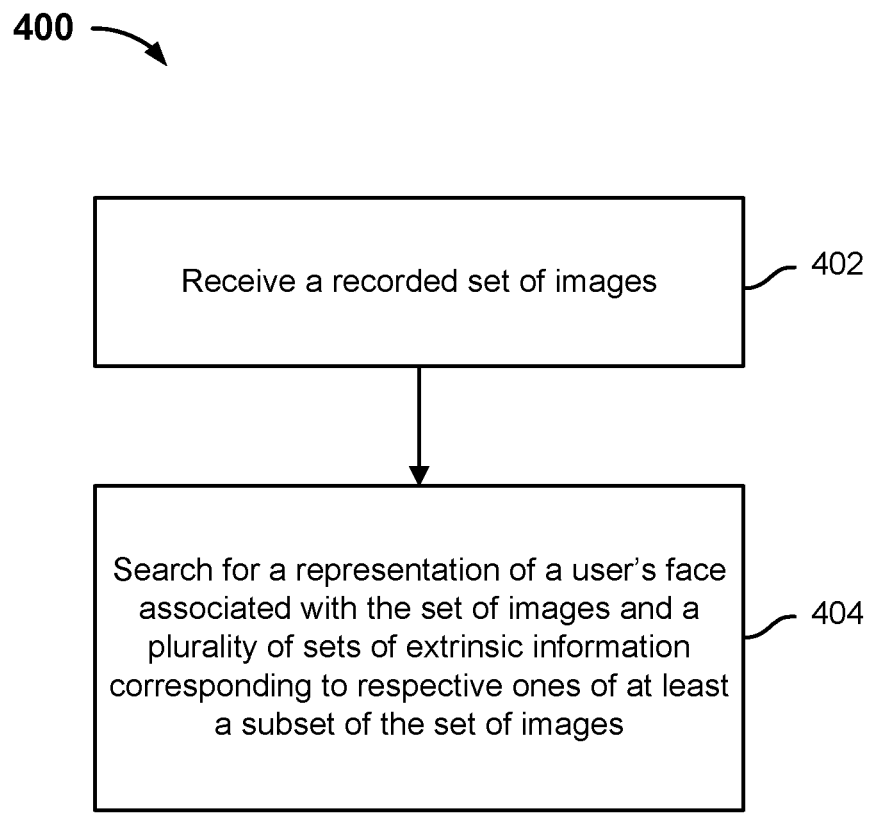
FIG. 4 is a flow diagram showing an example of a process for processing a set of images.

FIG. 4 is a flow diagram showing an example of a process for processing a set of images. In some embodiments, process 400 is implemented at system 100 of FIG. 1.

At 402, a recorded set of images is received. In various embodiments, the set of images corresponds to a recorded video or a series of snapshots of a user's face turned in different orientations. As such, each image of the set is associated with an orientation of the user's face in that image.

At 404, a representation of a user's face associated with the set of images and a plurality of sets of extrinsic information corresponding to respective ones of at least a subset of the set of images are searched for. In some embodiments, the representation of the user's face is a model in 3D space and is referred to as an M matrix. In some embodiments, the M matrix is determined based at least in part on measured reference points of one or more features associated with the user's face. In some embodiments, the extrinsic set of information associated with an image of the set of images is referred to as an (R, t) pair. An (R, t) pair is determined for each of at least a subset of the set of images so each image corresponds to a respective (R, t) pair that is associated with the orientation of the user's face in that image.

In some embodiments, an optimal M matrix is determined for the set of images and an optimal (R, t) pair is determined for each of at least a subset of the set of images. In a first example, a parameter search is used to perform iterative computations until the optimal M and set of (R, t) pairs are found. For example, a distribution of M matrices (e.g., that have been predetermined based on known face samples or generated on the fly) corresponding to the set of images and a distribution of (R, t) pairs corresponding to each image of the set of images are determined, and a combination of matrix M and (R, t) pairs that best describes at least a subset of the set of images is selected. In another example, a bundle adjustment technique is used and the bundle adjustment technique may treat the M and the set of (R, t) pairs as unknowns in an optimization problem and iteratively test out various combinations of M matrices and (R, t) pairs until an M and a set of (R, t) pairs are found that best match the set of images. For example, the optimal M matrix and an optimal (R, t) pair corresponding to an image result in the minimum reprojection error of any other combination of an M matrix and an (R, t) pair and therefore the combination of this M matrix and this (R, t) pair best matches the image corresponding to the (R, t) pair. While one M matrix is determined for the set of images, a set of (R, t) pairs, each corresponding to respective ones of at least a subset of the set of images, is determined.

Figure 5:
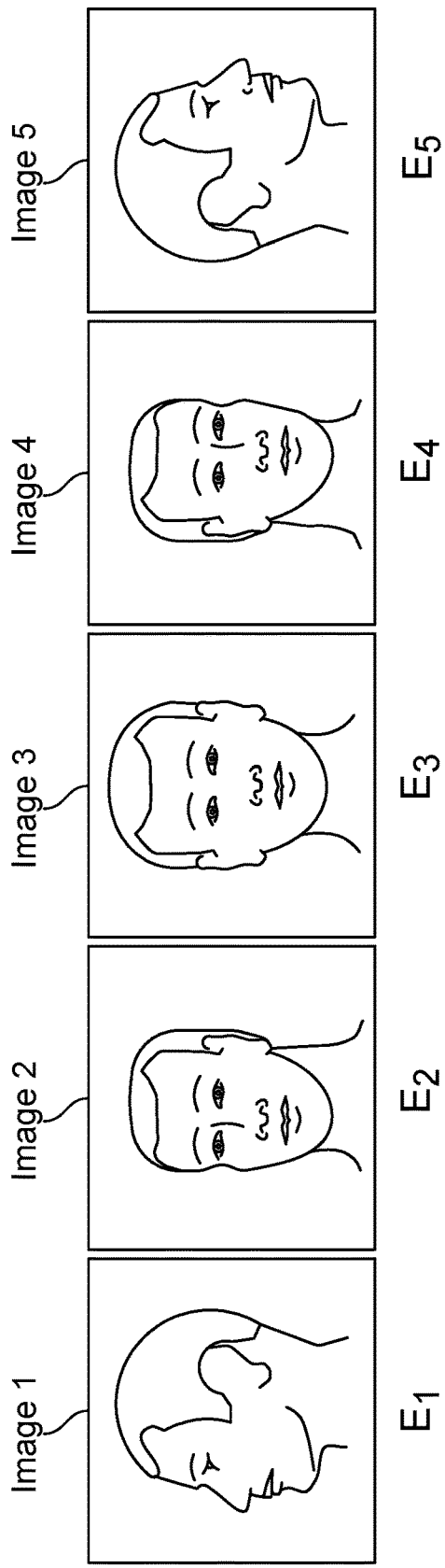
FIG. 5 is a diagram showing several images included in a set of images.

FIG. 5 is a diagram showing several images included in a set of images. In the example, Images 1, 2, 3, 4, and 5 are included in a recorded set of images of a user's face at various different orientations relative to the camera. As described above, a set of extrinsic information, E, (e.g., an (R, t) pair) that describes the orientation and translation of the user's face in an individual image is determined for that image. As shown in the example, each image is identified by a number 1 through 5 and has a corresponding set of extrinsic information, E, which includes the number associated with the image as its subscript (e.g., $E_1$ corresponds to Image 1, $E_2$ pair corresponds to Image 2, etc.). For example, $E_1$ may be used to transform a 3D generic face model that has been morphed to match a 3D model of the user's face in the set of images, the M matrix, in 3D space into the orientation and translation of the user's face that is shown in Image 1.

Figure 6:
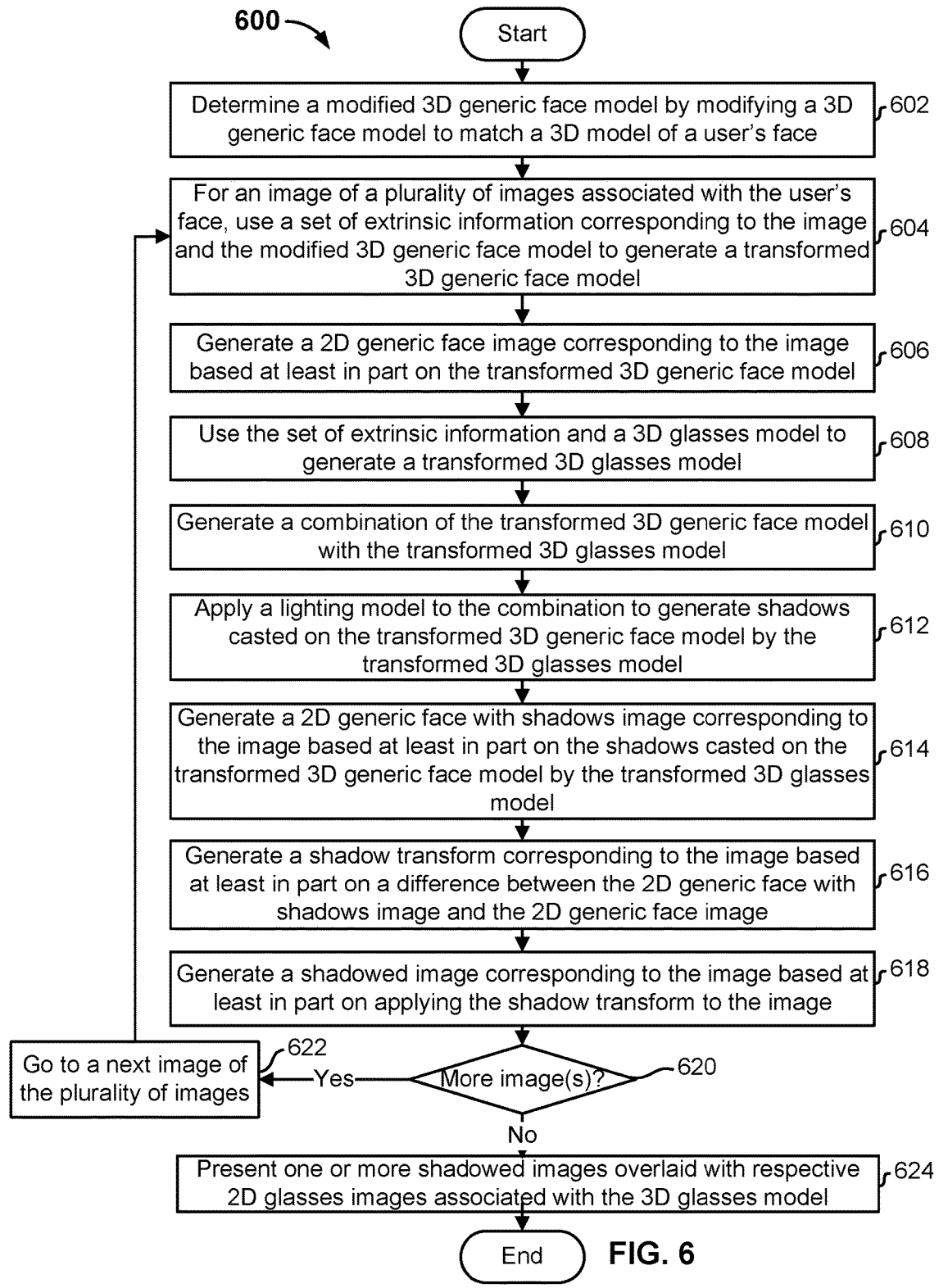
FIG. 6 is a flow diagram showing an example of a process for rendering glasses shadows.

FIG. 6 is a flow diagram showing an example of a process for rendering glasses shadows. In some embodiments, process 600 is implemented at system 100 of FIG. 1. In some embodiments, process 300 of FIG. 3 is implemented by a process such as process 600.

At 602, a modified 3D generic face model is determined by modifying a 3D generic face model to match a 3D model of a user's face. In some embodiments, a 3D generic face model comprises a greyscale model of a generic face. In some embodiments, a 3D generic face model comprises a Blender file. In some embodiments, a 3D generic face model can comprise any 3D model file format that is supported by a rendering engine. In some embodiments, modifying the 3D generic face model includes morphing the 3D generic face model to change its shape to correspond to the shape of the 3D model of the user's face. For example, the 3D generic face model is morphed to match a 3D model of a user's face (e.g., that was determined using a process such as process 400 of FIG. 4) by at least moving certain locations of the 3D generic face model to match corresponding locations on the 3D model of the user's face.

The following is one example technique by which to morph the 3D generic face model to correspond to the representation of the user's face: Define a set of reference points on a face. Examples of reference points may be related to facial features such as eye corners, a nose tip, cheekbones, and mouth corners. The 3D coordinate of each such reference point is located on the representation (e.g., 3D model) of the user's face and also on the 3D generic face model. The 3D generic face model is morphed to correspond to the 3D model of the user's face by moving the each reference point located on the 3D generic face model to match the 3D coordinate of the corresponding reference point located on the 3D model of the user's face. As each reference point located on the 3D generic face model is moved to match the 3D coordinate of the corresponding reference point located on the 3D model of the user's face, the neighboring portions of the 3D generic face model are pulled along with the movement.

At 604, for an image of the plurality of images associated with the user's face, a set of extrinsic information corresponding to the image and the modified 3D generic face model are used to generate a transformed 3D generic face model. A set of extrinsic information is determined corresponding to each image of the plurality of images (e.g., using a process such as process 400 of FIG. 4). The modified 3D generic face model is transformed by the set of extrinsic information determined for the image to orient the modified 3D generic face model to match the orientation of the user's face in the image.

At 606, a 2D generic face image corresponding to the image is generated based at least in part on the transformed 3D generic face model. A 2D generic face image corresponding to the image is generated by projecting the transformed 3D generic face model onto a 2D surface of the focal plane of a camera using a set of intrinsic information associated with the camera. For example, the 2D generic face image comprises a 2D projection of the transformed 3D generic face model that corresponds to the orientation of the user's face in that image.

At 608, the set of extrinsic information and a 3D glasses model are used to generate a transformed 3D glasses model. In various embodiments, a pair of glasses is selected to be virtually tried on by a user (e.g., associated with the plurality of images). In some embodiments, the pair of glasses is selected by a user. In some embodiments, the pair of glasses is selected based on a determined fit score between the glasses and the user associated with the plurality of images. In some embodiments, the fit score of a pair of glasses with respect to a user is determined by comparing one or more head measurements (e.g., the head measurements are determined based on reference points including endpoints of the user's eyebrow, endpoints of the user's eye, bridge of the user's nose, tip of the user's nose, etc.) determined from the plurality of images of the user's face against the stored information (e.g., dimensions of the glasses including a bridge length, a lens diameter, a temple distance, etc.) associated with various pairs of glasses. For example, a penalty function is used to evaluate the comparison between the user's head measurements and the glasses information to determine a fit score for the glasses. Various different glasses may be ranked based on their respective fit scores and a pair of glasses can be selected based on their corresponding fit score. For example, a pair of glasses with the highest fit score can be automatically selected to be tried on by the user.

A stored 3D model of the selected pair of glasses is also transformed by the set of extrinsic information determined for the image to orient the 3D glasses model to match the orientation of the user's face in the image.

At 610, a combination of the transformed 3D generic face model and the transformed 3D glasses model is generated. The transformed 3D glasses model is placed on the transformed 3D generic face model such that the glasses model covers the eyes of the generic face model. The following is one example technique by which to place the 3D glasses model over the transformed 3D generic face: For each 3D model of a user's face, where a 3D model of a generic pair of glasses should be placed relative to the user's face is determined. A 3D model of a generic pair of glasses comprises a set of 3D points, including, for example: two bridge points and two temple points. For example, a heuristic algorithm that receives eye corners, the nose tip, and ear junctions of the 3D model of the user's face as inputs can be used to compute the locations on the 3D model of the user's face that match the two bridge points and two temple points of the 3D model of the generic pair of glasses. Once the placement of the 3D model of the generic pair of glasses on the 3D model of the user's face is determined, for each 3D model of a specific pair of glasses, a transformation is computed to place the 3D model of the specific pair of glasses on the 3D model of the user's face such that the distance between the points of the 3D model of the specific pair of glasses and the points of the 3D model of the generic pair of glasses is minimized.

Figure 7:
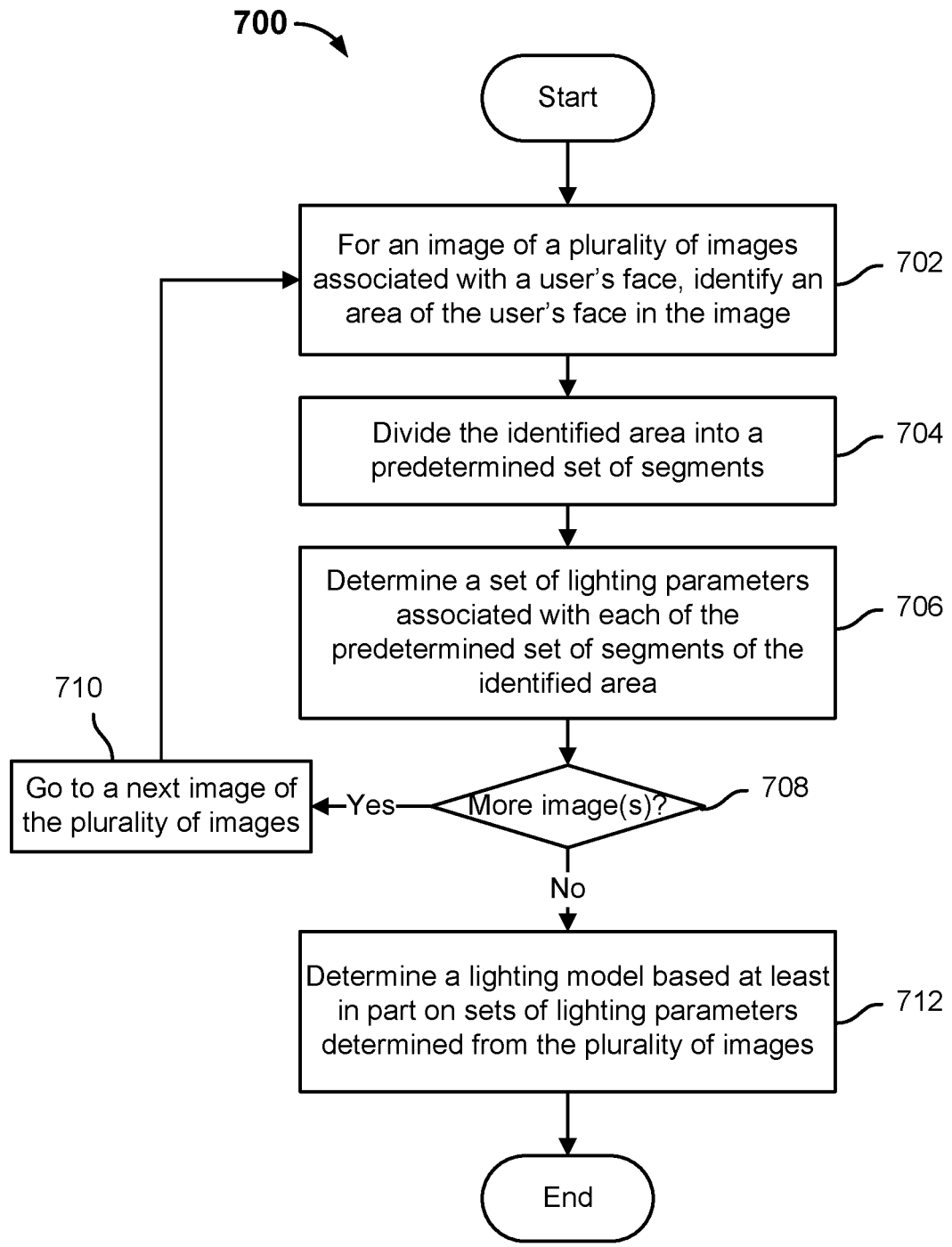
FIG. 7 is a flow diagram showing an example of a process for determining a lighting model from a set of images of a user's face.

At 612, a lighting model is applied to the combination to generate shadows casted on the transformed 3D generic face model by the transformed 3D glasses model. A lighting model is applied to the transformed 3D generic face model wearing the transformed 3D glasses model to generate the shadows casted by the glasses model onto the generic face model. For example, the shadows can be generated on the generic face model using ray-tracing. In some embodiments, the lighting model emulates the lighting directed at the user's face in the specific light environment in which the user is located. In some embodiments, the lighting model is determined from the plurality of images of the user's face. FIG. 7, below, describes an example process of determining such a lighting model.

At 614, a 2D generic face with shadows image corresponding to the image is generated based at least in part on the shadows casted on the transformed 3D generic face model by the transformed 3D glasses model. A 2D generic face with shadows image corresponding to the image is generated by projecting the transformed 3D generic face model with the shadows casted by the transformed 3D glasses model onto a 2D surface of the focal plane of a camera using a set of intrinsic information associated with the camera. In various embodiments, the shadows casted by the frame of the glasses as well as the shadows casted by the lenses of the glasses are rendered on the generic face model. For example, if the lenses were colored, then the casted shadows would include such corresponding color. In various embodiments, the glasses model is not included in the 2D generic face with shadows image and instead, only the shadows that the glasses model had casted is included in the 2D generic face with shadows image.

Figure 8:
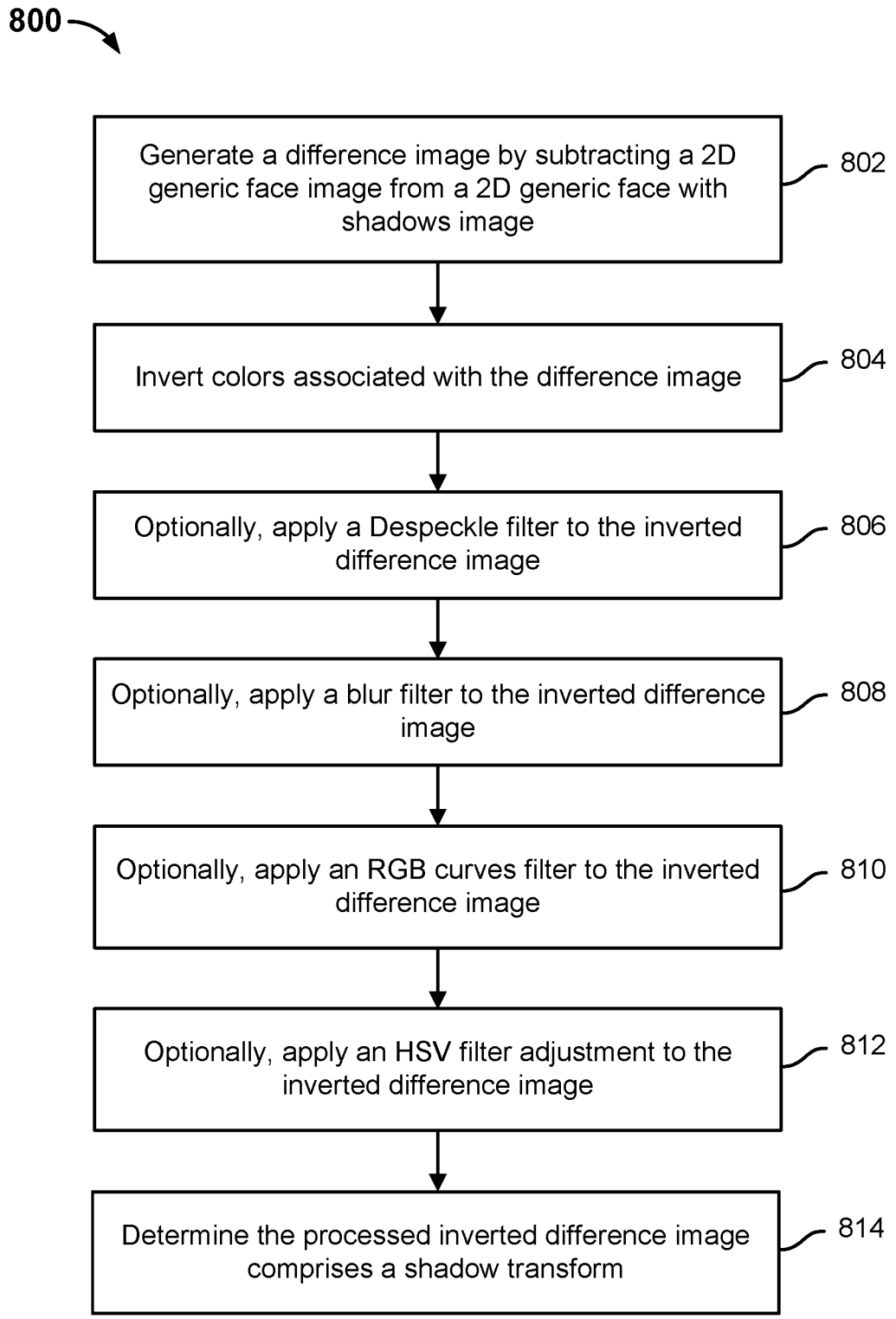
FIG. 8 is a flow diagram showing an embodiment of a process for determining a shadow transform corresponding to an image of a user's face.

At 616, a shadow transform corresponding to the image is generated based at least in part on a difference between the 2D generic face image and the 2D generic face with shadows image. A shadow transform corresponding to the image comprises a difference image generated by subtracting the 2D generic face image (generated at step 606) from the 2D generic face with shadows image (generated at step 614). The difference image comprises a 2D image of only the shadows casted by the glasses model onto the generic face. As mentioned above, the shadows may be in greyscale or in color, depending on the color of the glasses frame and/or glasses lens. In some embodiments, the difference image is further processed before being used as the shadow transform. FIG. 8, below, describes an example process of generating a shadow transform including by further processing the difference image.

At 618, a shadowed image corresponding to the image is generated based at least in part on applying the shadow transform to the image. In various embodiments, a shadowed image corresponding to the image appears like the original image with the addition of the shadow transform in the areas of the face (e.g., the eyes) that were affected by the shadows casted by the glasses model. In various embodiments, a shadowed image corresponding to the image is generated by multiplying the original image with the corresponding shadow transform. For example, if the pixel values of the shadow transform were not on a scale of 0 to 1, they are scaled to be on a scale of 0 to 1. Then, the scaled pixel values of the shadow transform are multiplied with each channel (e.g., Red, Green, and Blue) value of each corresponding pixel of the original image. Put another way, the shadow transform can be thought of as being placed over the original image and a channel value of each pixel of the shadowed image is determined by multiplying the channel value of each pixel of the original image with a corresponding value of a corresponding pixel of the shadow transform.

At 620, it is determined whether there is at least one more image in the plurality of images. In the event that there is at least one more image in the plurality of images, control is transferred to step 622, at which the next image in the plurality of images is to be addressed starting again from step 604. Otherwise, in the event that there is not at least one more image in the plurality of images, control is transferred to step 624.

At 624, one or more shadowed images overlaid with respective 2D glasses images associated with the 3D glasses model are presented. Each shadowed image corresponding to at least a subset of the plurality of images is presented with an overlay of a 2D image of the selected pair of glasses. For example, the 2D image of the selected pair of glasses can be generated for each image by transforming the 3D glasses model using the set of extrinsic information associated with that image and then projecting the transformed 3D glasses model onto a 2D surface of the focal plane of a camera using a set of intrinsic information associated with the camera. While each shadowed image shows only the simulated shadows as casted by the glasses, the overlay of the corresponding 2D glasses image completes the effect of glasses being virtually worn by the user and therefore casting such shadows. Each presented shadowed image is presented with a corresponding 2D glasses image. For example, a user may interact with this playback of shadowed images to skip through different views of the user's face with the rendered glasses image and corresponding glasses shadows casted on the user's face.

As described above, because the shadow transform was rendered using a 3D generic face model and then applied to an actual image of a user's face, the glasses shadows effect can be efficiently produced much faster than would be possible if a detailed 3D model of the user's face (e.g., a 3D model with a texture of the user's skin) was first generated and then the glasses shadows were produced on the detailed 3D model of the user's face.

FIG. 7 is a flow diagram showing an example of a process for determining a lighting model from a set of images of a user's face. In some embodiments, process 700 is implemented at system 100 of FIG. 1.

For example, the lighting model used in step 612 of process 600 of FIG. 6 is determined using a process such as process 700. Process 700 describes an example process of determining a model that emulates the lighting received in the set of images of a user's face.

At 702, for an image of a plurality of images associated with a user's face, an area of the user's face in the image is identified. The area within an image of the user's face and/or head that contains the user's face is detected and identified.

At 704, the identified area is divided into a predetermined set of segments. In some embodiments, the identified area is divided into one or more segments, each of a predetermined shape and location relative to the identified area of the user's face in the image. For example, the identified area of the user's face in the image can be divided into five segments (e.g., rectangular segments) along the front of the user's face/head, one segment (e.g., a polygonal segment) on top of the user's face/head, one segment under the user's face/head, and one segment along the back of the user's face/head.

At 706, a set of lighting parameters associated with each of the predetermined set of segments of the identified area is determined. A set of lighting parameters is determined for each segment of the identified area of the user's face/head in the image. Examples of lighting parameters include an intensity of the light and a color of the light that are received in each segment in that image. Other examples of lighting parameters to be determined for each segment may include a direction of the light and a source of the light. In some embodiments, in addition to the set of lighting parameters associated with each segment, ambient lighting parameters are determined from the image. For example, ambient lighting parameters describe light that has no origin, no direction, and has an equal effect on all objects in the scene.

At 708, it is determined whether there is at least one more image in the set. In the event that there is at least one more image in the plurality of images, control is transferred to step 710, at which the next image in the plurality of images is to be addressed starting again from step 702. Otherwise, in the event that there is not at least one more image in the plurality of images, control is transferred to step 712.

At 712, a lighting model is determined based at least in part on the sets of lighting parameters determined from the plurality of images. The sets of lighting parameters determined for respective ones of images in the plurality of images are used together to determine a lighting model. For example, the average of the lighting parameters (e.g., the average direction of the light, the average source of the light, the average intensity of the light, and/or the average color of the light) received in the same segment across all the images is determined to represent the lighting received by and therefore emitted by that segment of the lighting model.

For example, a lighting model comprises a 3D container that is formed by the predetermined segments and where each segment emits light inside the container based on the computed lighting received by the segment in constructing the lighting model. To apply the lighting model to the transformed 3D generic face model wearing the transformed 3D glasses model, the transformed 3D generic face model wearing the transformed 3D glasses model is placed inside the 3D container associated with the lighting model and the computed light is emitted from each segment onto the transformed 3D glasses model to cause the glasses model to cast shadows onto the transformed 3D generic face model.

FIG. 8 is a flow diagram showing an embodiment of a process for determining a shadow transform corresponding to an image of a user's face. In some embodiments, process 800 is implemented at system 100 of FIG. 1. In some embodiments, step 616 of process 600 of FIG. 6 is implemented with process 800.

At 802, a difference image is generated by subtracting a 2D generic face image from a 2D generic face with shadows image. A 2D generic face image corresponding to an image of a user's face and a 2D generic face with shadows image corresponding to the image of the user's face are already generated (e.g., using steps such as 602 through 614 of process 600 of FIG. 6). The resulting image, the difference image, when the 2D generic face image is subtracted from the 2D generic face with shadows image, comprises a 2D image of only the shadows casted by the transformed 3D glasses model onto the transformed 3D generic face model. The shadows may be casted by the frame of the glasses and/or the lenses of the glasses. In the event that the lenses of the glasses are colored, then the difference image includes the color.

At 804, colors associated with the difference image are inverted. The difference image is inverted by inverting all the pixel colors and brightness values in the image. Due to inversion, the dark areas will become bright and the bright areas will become dark. Furthermore, hues are replaced by their complementary colors.

At 806, optionally, a Despeckle filter is applied to the inverted difference image. This step of processing the inverted difference image is optionally performed. Applying the Despeckle filter to the difference image locates and removes small clusters or other forms of rendering noise. The Despeckle filter replaces each pixel with the median value of the pixels within a specified radius of pixels.

At 808, optionally, a blur filter is applied to the inverted difference image. This step of processing the inverted difference image is optionally performed. In some embodiments, if this step is performed, it is performed after application of the Despeckle filter to the inverted difference image. Applying a blur filter (e.g., a Gaussian filter) blurs and/or softens the image. For example, blurring the image with a Gaussian kernel includes computing a new pixel value for each pixel of the image based on a weighted average of the pixel values in that pixel's neighborhood. The original pixel's value receives the heaviest weight (e.g., having the highest Gaussian value) and neighboring pixels receive smaller weights as their distance to the original pixel increases.

At 810, optionally, a red, green, and blue (RGB) curves filter is applied to the inverted difference image. This step of processing the inverted difference image is optionally performed. In some embodiments, if this step is performed, it is performed after application of the blur filter to the inverted difference image. Applying an RGB curves filter adjusts the contrast in the image. For example, applying the RGB curves filter allows a user to individually adjust the quantity of each of the Red, Green, and Blue channels to change the contrast of the difference image.

At 812, optionally, a hue, saturation, and value (HSV) filter adjustment is applied to the inverted difference image. This step of processing the inverted difference image is optionally performed. In some embodiments, if this step is performed, it is performed after application of the RGB curves filter to the inverted difference image. Applying an HSV filter causes the color of the lenses of the glasses in the image to be less subtle. In some embodiments, predetermined settings have been set for the HSV filter. As such, the HSV filter can be applied without user interaction. For example, the predetermined HSV filter parameters are determined based on manual verification of a selected set of 3D models of glasses.

At 814, the processed inverted difference image is determined to comprise a shadow transform. The inverted difference image that has been processed by one or more processors is used as a shadow transform for the image of the user's face.

FIGS. 9 through 24 below show example visualizations associated with various steps of rendering glasses shadows for one image of a user's face based on the embodiments described above.

FIG. 9 is a diagram showing an example of an image of a user's face. User image 900 can be one of multiple images that are associated with the user's face/head at various angles. User image 900 comprises a 2D image of the user's face as the user is front facing the camera. For example, user image 900 comprises a photograph or a frame from a video. A set of extrinsic information that describes the orientation (e.g., rotation and translation of a 3D model of the user's face to match the user's face in user image 900) of the user's face in user image 900 is already determined. FIGS. 10 through 24 below will describe an example of generating a shadow transform corresponding to user image 900 and a technique of using the shadow transform.

Figure 10:
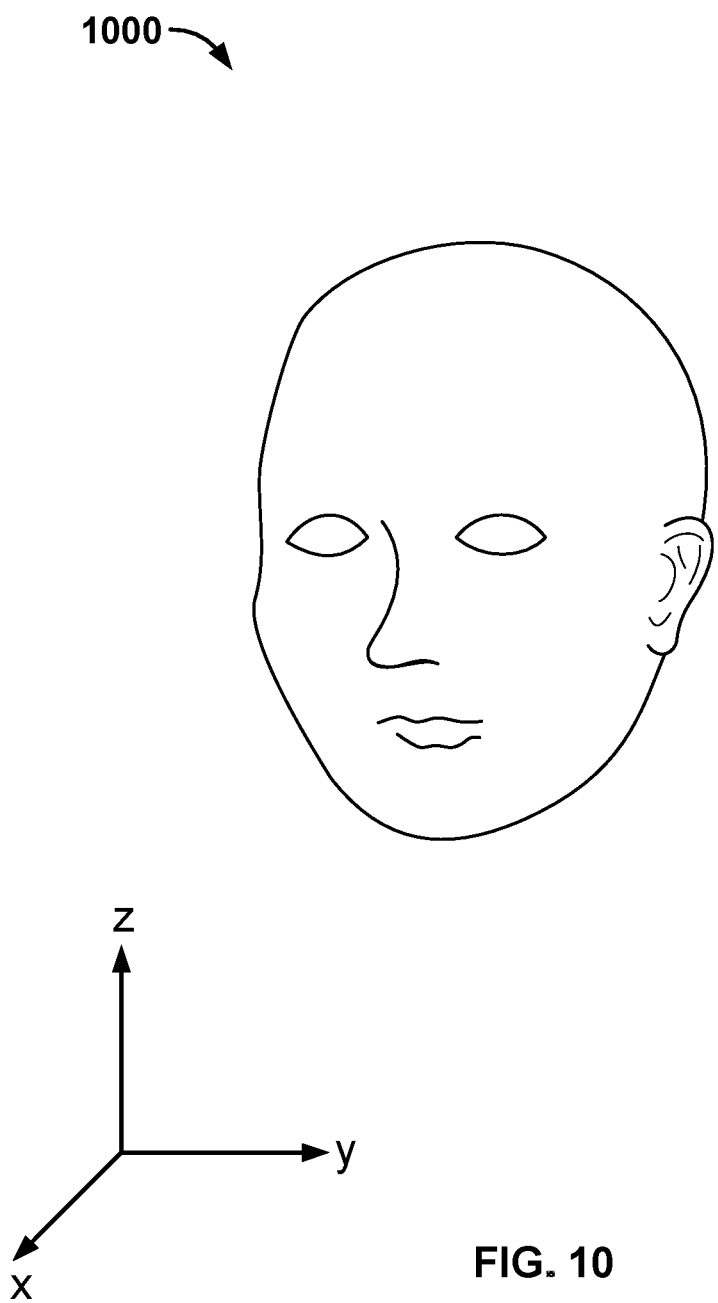
FIG. 10 is a diagram showing an example of a visualization of a 3D generic face model in 3D space.

FIG. 10 is a diagram showing an example of a visualization of a 3D generic face model in 3D space. For example, 3D generic face model 1000 was stored. For example, 3D generic face model 1000 is modeled from the 3D models of previous users of the system and/or is determined on the fly. In various embodiments, 3D generic face model 1000 comprises a greyscale model. For example, 3D generic face model 1000 is a Blender file.

Figure 11:
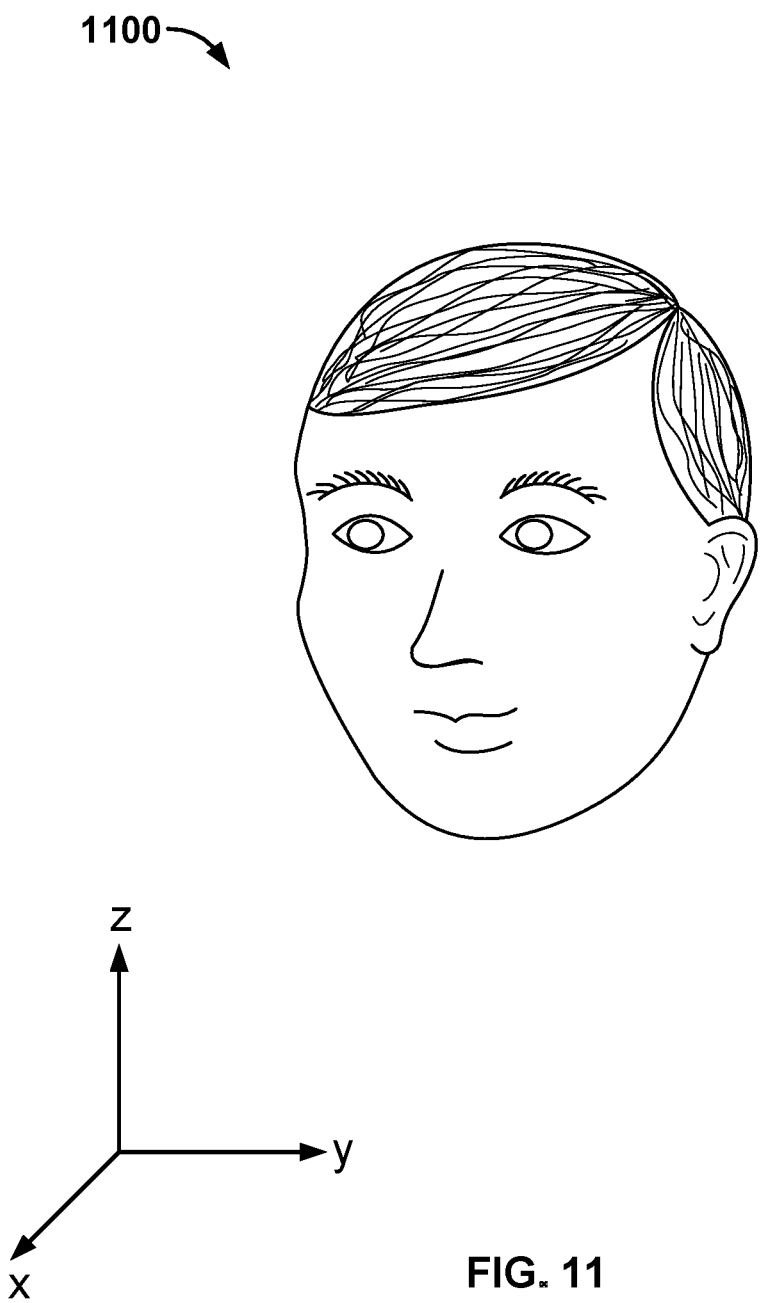
FIG. 11 is a diagram showing an example of a visualization of a 3D model of a user's face in 3D space.

FIG. 11 is a diagram showing an example of a visualization of a 3D model of a user's face in 3D space. For example, 3D model of a user's face 1100 was constructed using a set of images of a user's face that includes user image 900 of FIG. 9. For example, 3D model of a user's face 1100 was determined based on a set of reference points associated with features on the user's face from the set of images. Examples of reference points include endpoints of the user's eye, bridge of the user's nose, and tip of the user's nose. In some embodiments, 3D model of a user's face 1100 was determined using a process such as process 400 of FIG. 4.

Figure 12:
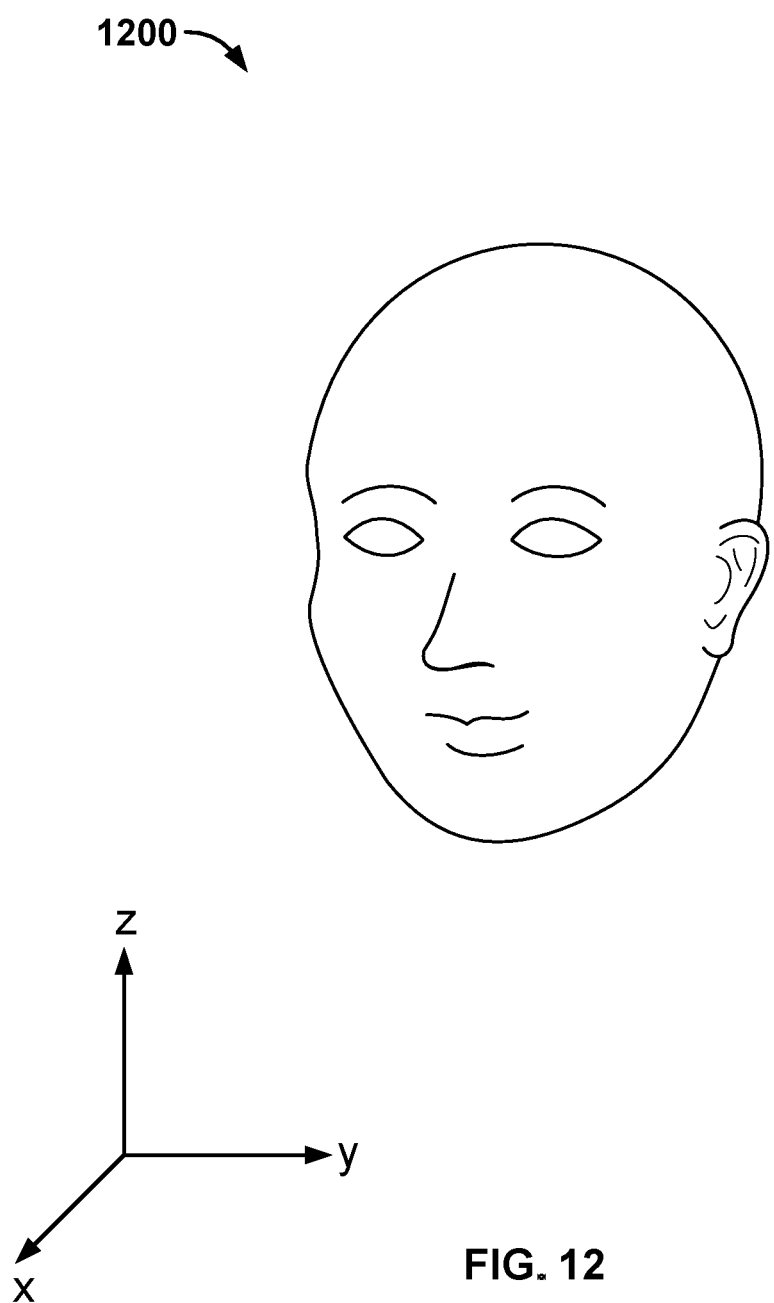
FIG. 12 is a diagram showing an example of a visualization of a morphed 3D generic face model in 3D space.

FIG. 12 is a diagram showing an example of a visualization of a morphed 3D generic face model in 3D space. In some embodiments, a 3D generic face model is morphed to match a 3D model of a user's face. In the example of FIG. 12, morphed 3D generic face model 1200 was the result of morphing 3D generic face model 1000 of FIG. 10 to match 3D model of a user's face 1100 of FIG. 11. Morphing 3D generic face model 1000 of FIG. 10 to match 3D model of a user's face 1100 of FIG. 11 includes, for example, moving the certain areas of 3D generic face model 1000 of FIG. 10 to corresponding locations on 3D model of a user's face 1100 of FIG. 11 in 3D space. As such, morphed 3D generic face model 1200 has a similar shape and features as those of 3D model of a user's face 1100 of FIG. 11. For example, morphed 3D generic face model 1200 is an example of a morphed 3D generic face model that is determined in step 602 of process 600 of FIG. 6.

Figure 13:
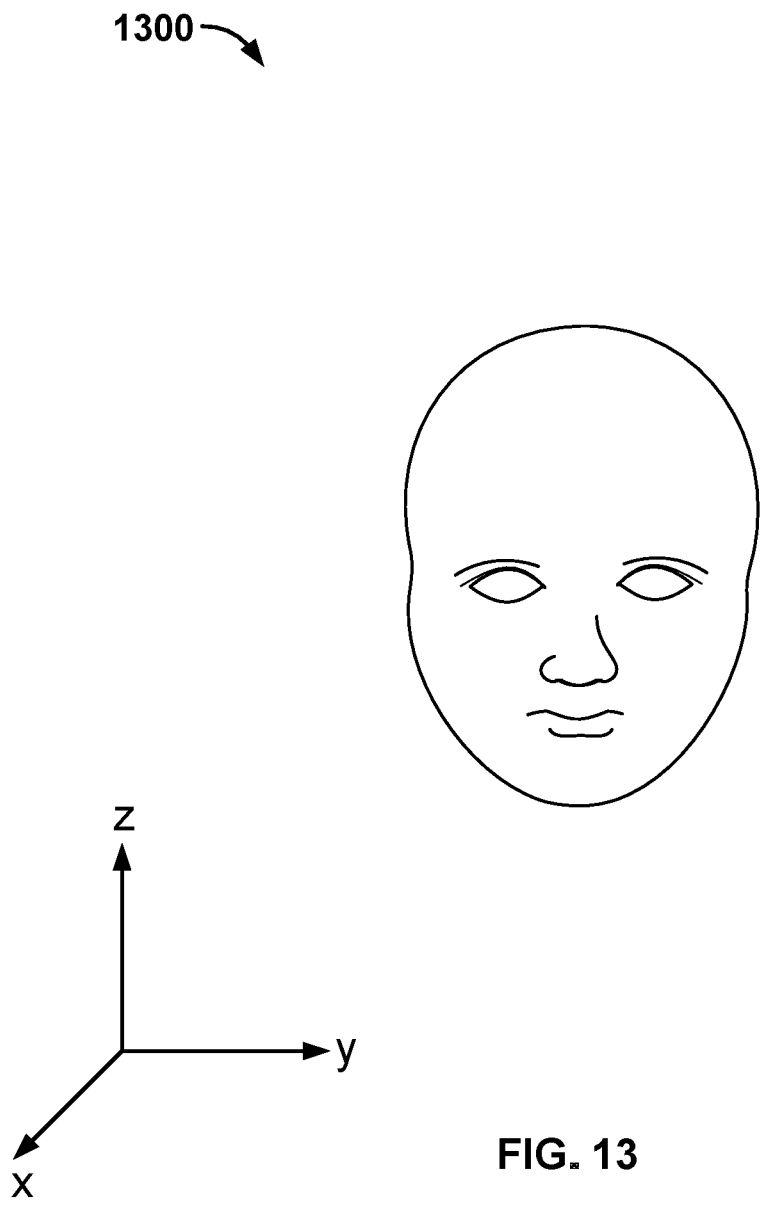
FIG. 13 is a diagram showing an example of a visualization of a transformed 3D generic face model in 3D space.

FIG. 13 is a diagram showing an example of a visualization of a transformed 3D generic face model in 3D space. Transformed 3D generic face model 1300 comprises morphed 3D generic face model 1200 of FIG. 12 after it was transformed to match the orientation of user image 900 of FIG. 9 using the set of extrinsic information corresponding to user image 900 of FIG. 9. As such, transformed 3D generic face model 1300 is also front facing the camera. For example, transformed 3D generic face model 1300 is an example of a transformed 3D generic face model that is generated in step 604 of process 600 of FIG. 6.

Figure 14:
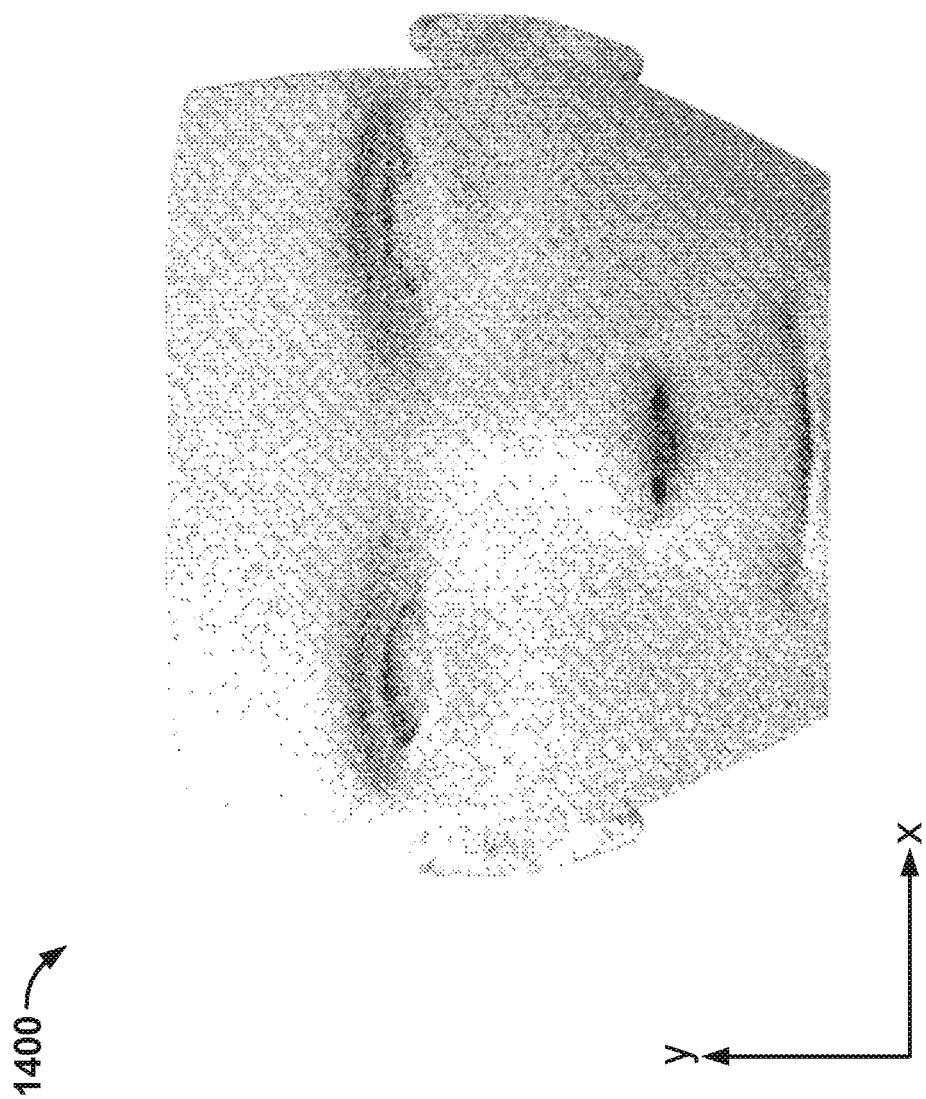
FIG. 14 is a diagram showing an example of a 2D generic face image.

FIG. 14 is a diagram showing an example of a 2D generic face image. 2D generic face image 1400 comprises a projection of transformed 3D generic face model 1300 of FIG.

13 onto a 2D surface of the focal plane of a camera using a set of intrinsic information associated with the camera. 2D generic face image 1400 comprises a rendering using primitive material and a low number of rays in a ray-tracing engine. For example, 2D generic face image 1400 is an example of a 2D generic face image that is generated in step 606 of process 600 of FIG. 6.

FIG. 15 is a diagram showing an example of a transformed 3D generic face model combined with a transformed 3D glasses model in 3D space. Transformed 3D generic face model wearing a transformed 3D glasses model 1500 comprises transformed 3D generic face model 1300 of FIG. 13 fitted with 3D glasses model 1502 that was transformed to match the orientation of transformed 3D generic face model 1300 of FIG. 13. For example, 3D glasses model 1502 is associated with a pair of glasses that was selected to be virtually tried on by the user. For example, 3D glasses model 1502 was also transformed using the set of extrinsic information corresponding to user image 900 of FIG. 9. As such, the transformed glasses model matches the front facing orientation of transformed 3D generic face model 1300 of FIG. 13 and is also fitted onto transformed 3D generic face model 1300 of FIG. 13 such that transformed 3D generic face model 1300 of FIG. 13 appears to be wearing 3D glasses model 1502. For example, transformed 3D generic face model wearing a transformed 3D glasses model 1500 is an example of a combination of the transformed 3D generic face model with the transformed 3D glasses model that is generated in step 610 of process 600 of FIG. 6.

A lighting model can then be applied to transformed 3D generic face model wearing a transformed 3D glasses model 1500 to generate the shadows casted by the 3D glasses model onto the 3D generic face model (not shown in FIG. 15).

Figure 16:
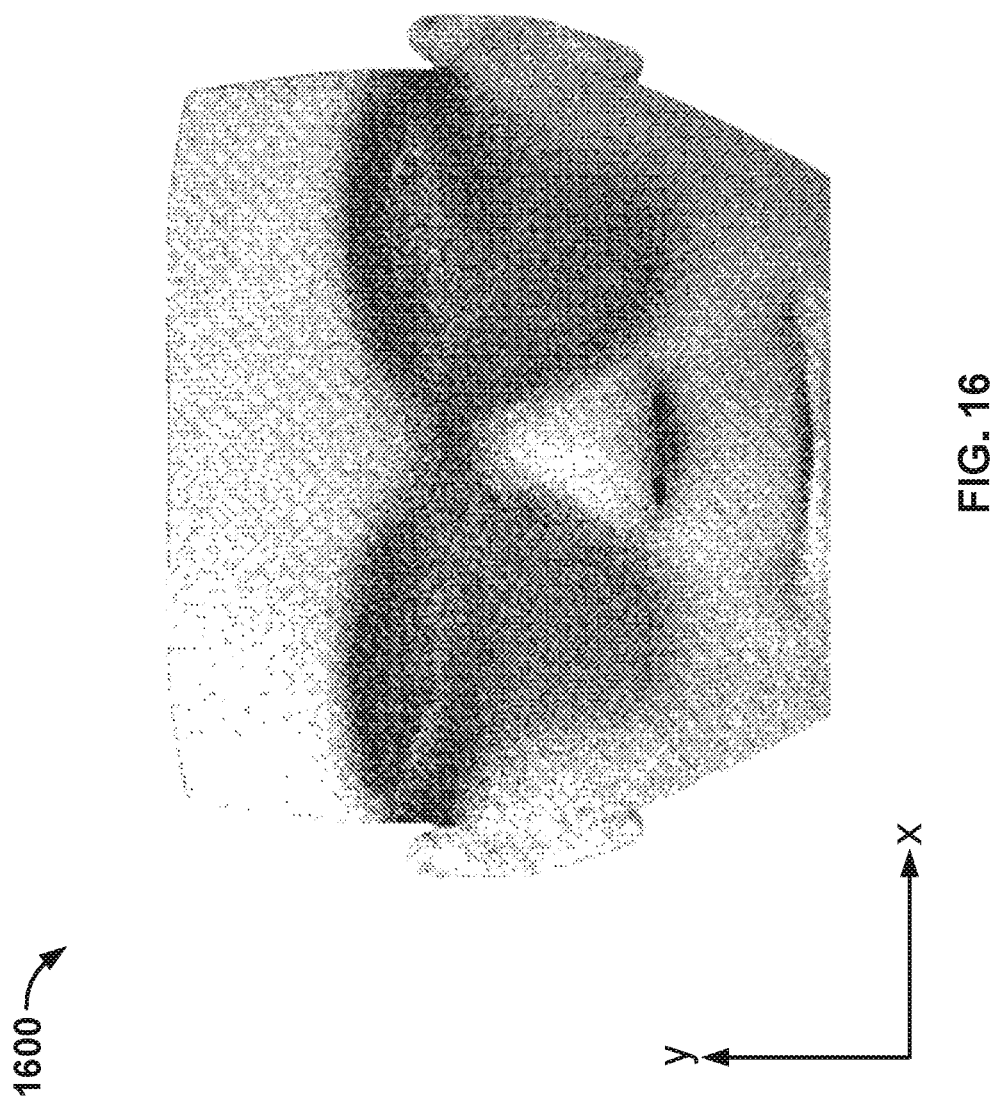
FIG. 16 is a diagram showing an example of a 2D generic face with shadows image.

FIG. 16 is a diagram showing an example of a 2D generic face with shadows image. 2D generic face with shadows image 1600 comprises a projection of transformed 3D generic face model wearing a transformed 3D glasses model 1500 of FIG. 15, after the glasses shadows were generated, onto a 2D surface of the focal plane of a camera using a set of intrinsic information. 2D generic face with shadows image 1600 comprises a 2D image of the generic face with the shadows casted by the glasses model but does not include the glasses themselves. 2D generic face with shadows image 1600 comprises a rendering using primitive material and a low number of rays in a ray-tracing engine. For example, 2D generic face with shadows image 1600 is an example of a 2D generic face with shadows image that is generated in step 614 of process 600 of FIG. 6.

Figure 17:
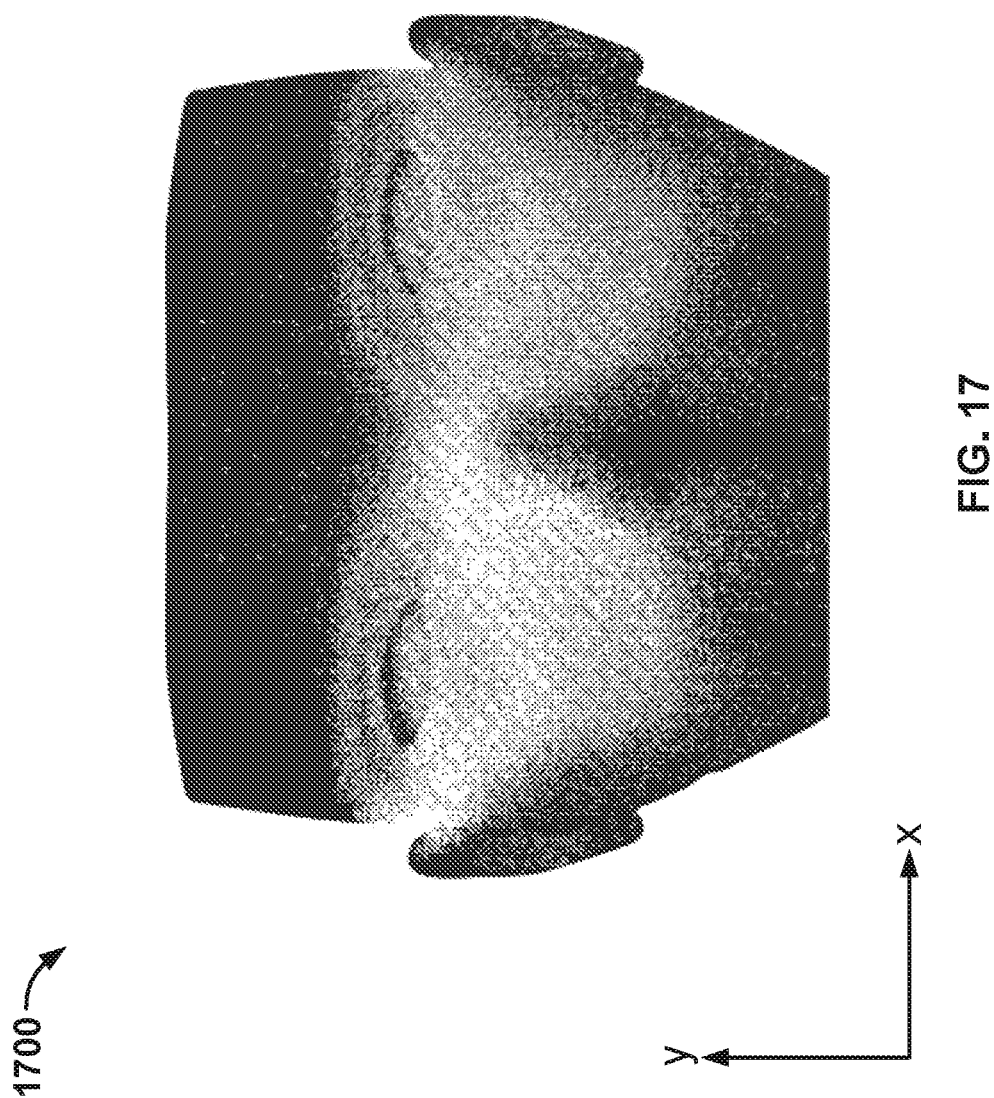
FIG. 17 is a diagram showing an example of a difference image determined based on a 2D generic face image and a 2D generic face with shadows image.

FIG. 17 is a diagram showing an example of a difference image determined based on a 2D generic face image and a 2D generic face with shadows image. Difference image 1700 is determined by subtracting 2D generic face image 1400 of FIG. 14 from 2D generic face with shadows image 1600 of FIG. 16. Difference image 1700 may include only greyscale colors or non-grayscale colors, depending on the color of the glasses model's frame and lenses. For example, difference image 1700 comprises the difference image generated at step 802 of FIG. 8.

Figure 18:
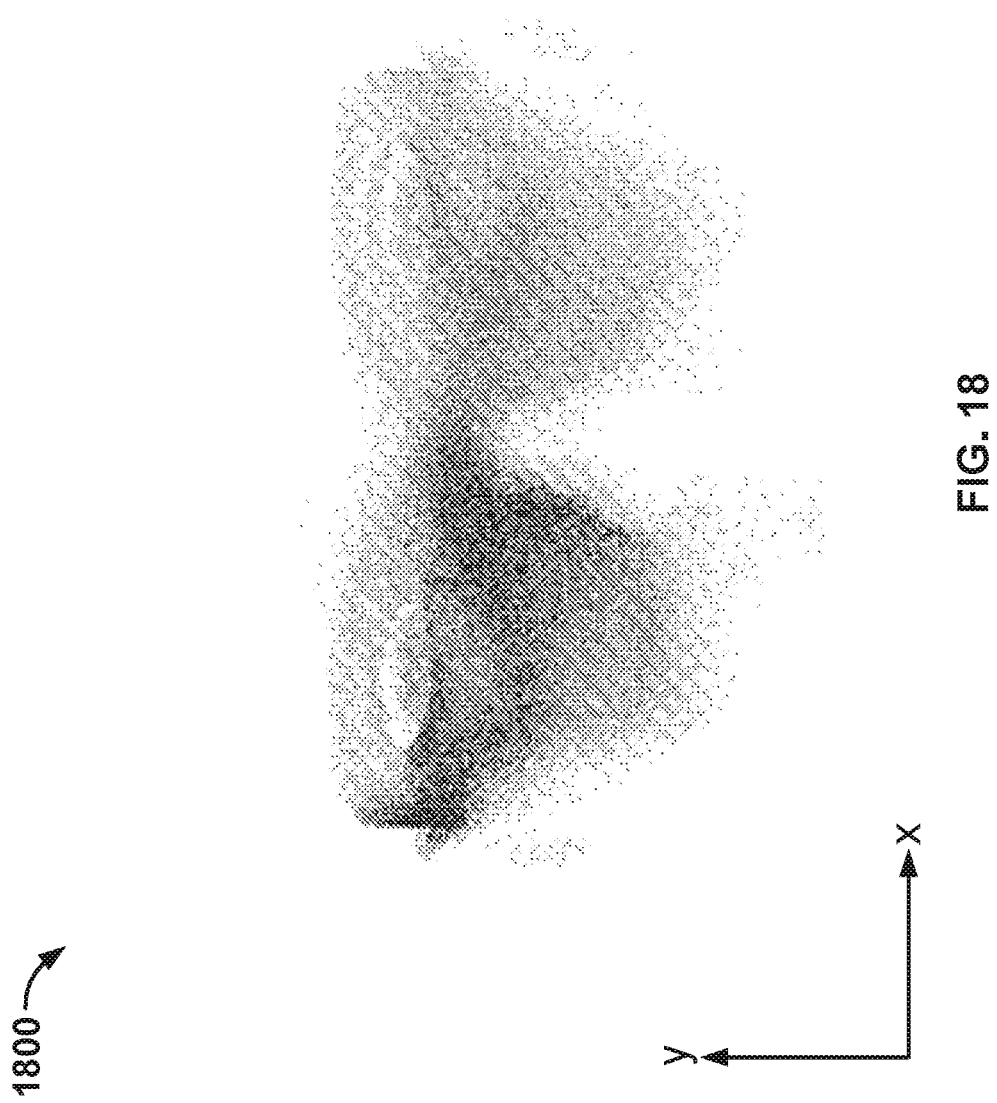
FIG. 18 is a diagram showing an example of an inverted difference image.

FIG. 18 is a diagram showing an example of an inverted difference image. Inverted difference image 1800 comprises the inversion of difference image 1700 of FIG. 17. As such, the dark and light colors of difference image 1700 of FIG. 17 are inverted in inverted difference image 1800. For example, inverted different image 1800 is the result of step 804 of process 800 of FIG. 8

Figure 19:
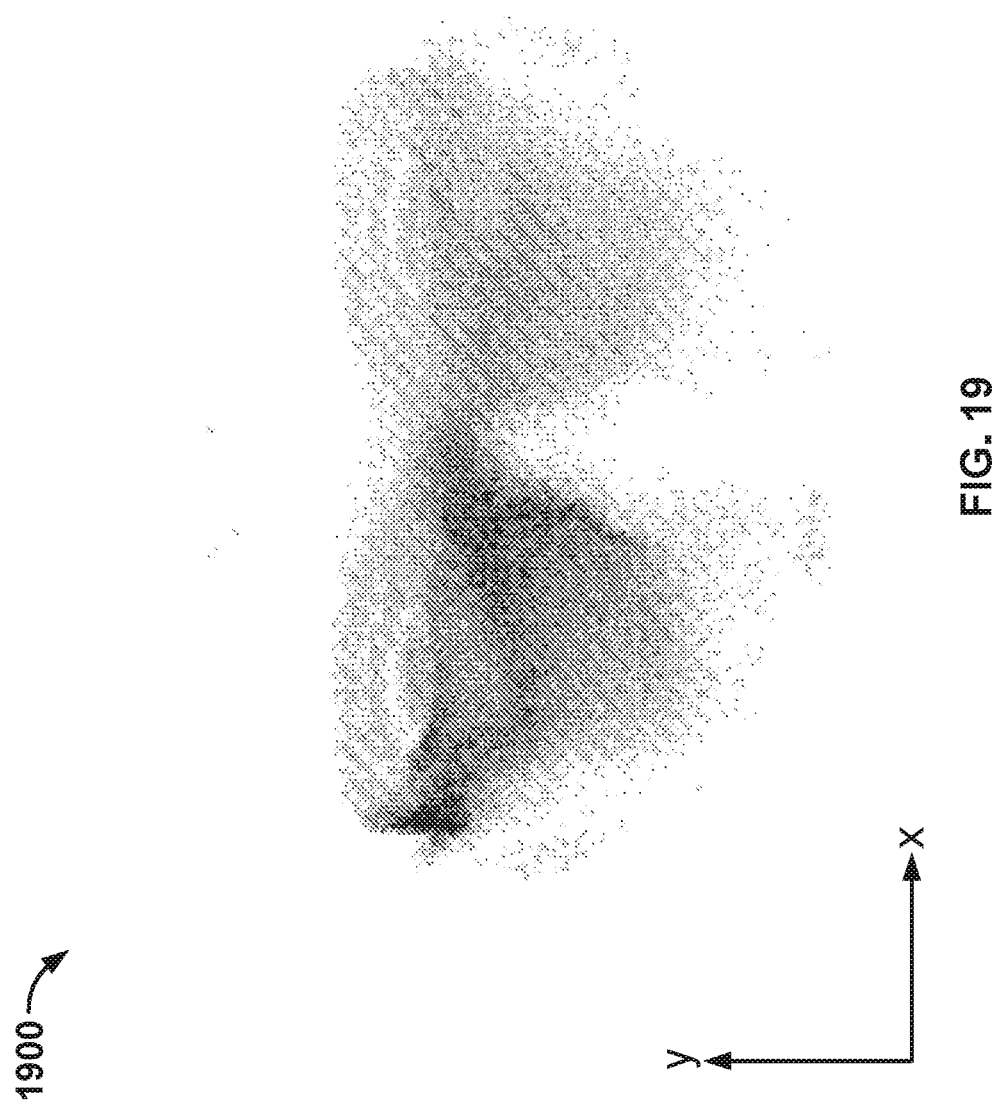
FIG. 19 is a diagram showing an example of an inverted difference image to which a Despeckle filter has been applied.

FIG. 19 is a diagram showing an example of an inverted difference image to which a Despeckle filter has been applied. Processed inverted difference image 1900 comprises inverted difference image 1800 of FIG. 18 after a Despeckle filter has been applied to it. The Despeckle filter has removed some of the rendering noise from inverted difference image 1800 of FIG. 18. For example, processed inverted difference image 1900 comprises the result of step 806 of process 800 of FIG. 8.

Figure 20:
FIG. 20 is a diagram showing an example of a previously processed difference image to which a blur filter has been applied.

FIG. 20 is a diagram showing an example of a previously processed difference image to which a blur filter has been applied. Processed inverted difference image 2000 comprises processed difference image 1900 of FIG. 19 after a blur filter has been applied to it. The blur filter has smoothed processed difference image 1900 of FIG. 19. An example blur filter is a Gaussian filter. For example, processed inverted difference image 2000 comprises the result of step 808 of process 800 of FIG. 8.

Figure 21:
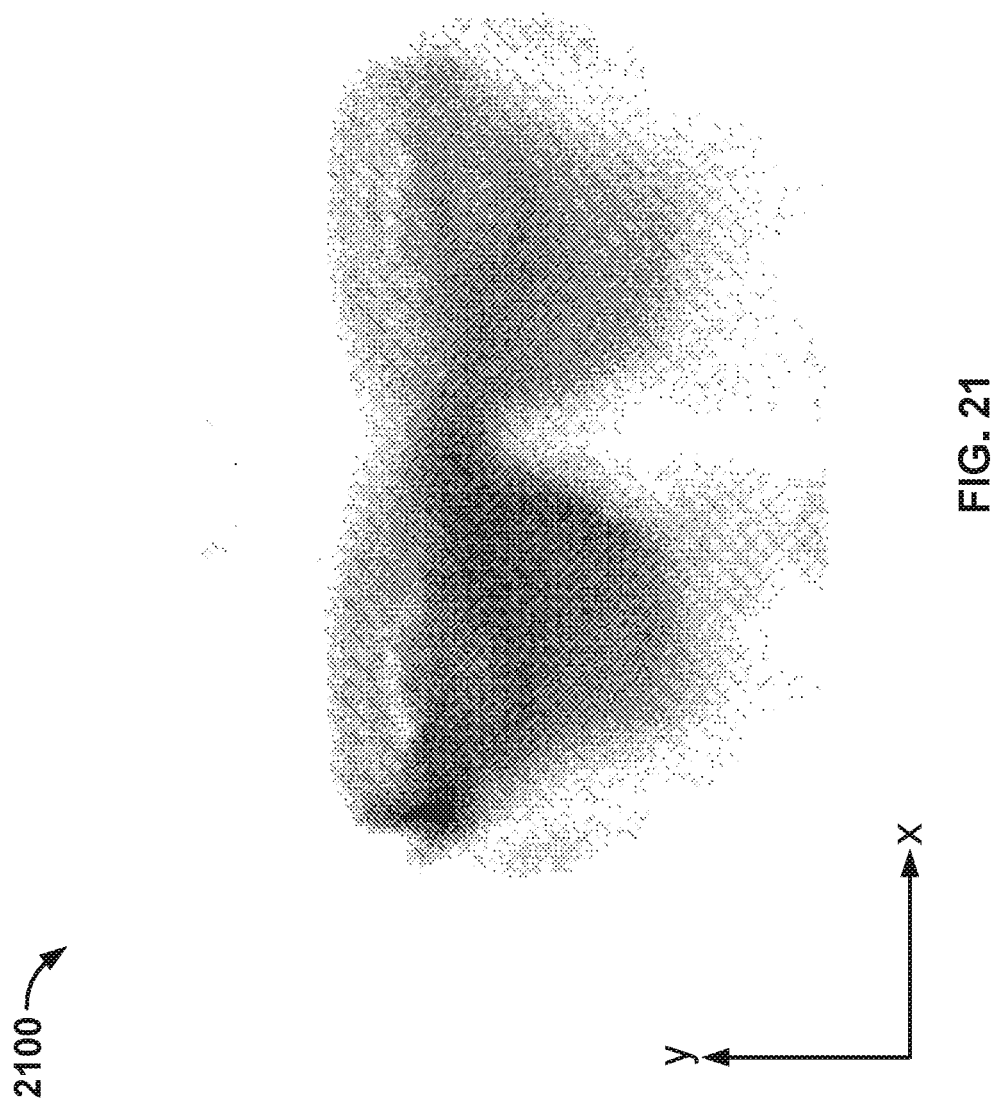
FIG. 21 is a diagram showing an example of a previously processed difference image to which an RGB curves filter has been applied.

FIG. 21 is a diagram showing an example of a previously processed difference image to which an RGB curves filter has been applied. Processed inverted difference image 2100 comprises processed difference image 2000 of FIG. 20 after an RGB curves filter has been applied to it. The RGB curves filter has adjusted the image contrast of processed difference image 2000 of FIG. 20. In the example of FIG. 21, the RGB curves filter has increased the image contrast of processed difference image 2000 of FIG. 20 to generate processed inverted difference image 2100. For example, processed inverted difference image 2100 comprises the result of step 810 of process 800 of FIG. 8.

Figure 22:
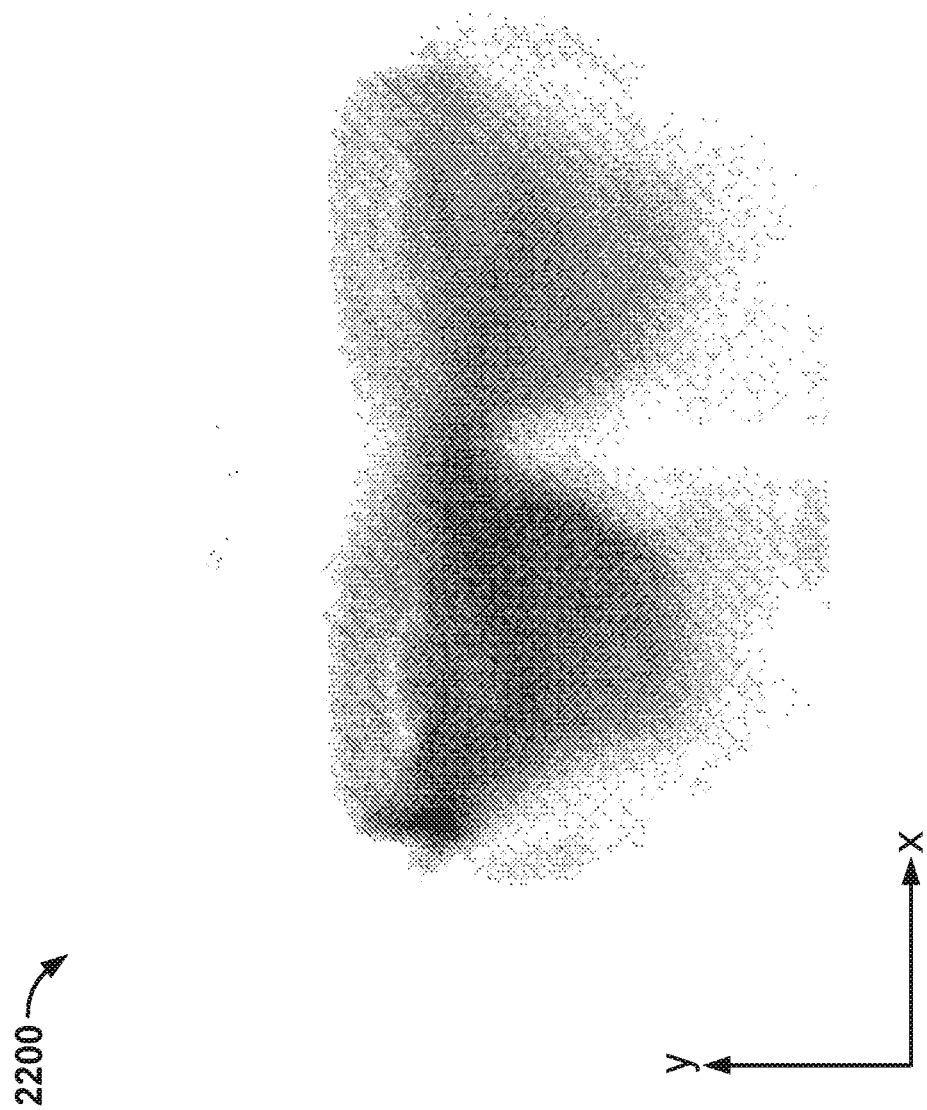
FIG. 22 is a diagram showing an example of a previously processed difference image to which an HSV filter adjustment has been applied.

FIG. 22 is a diagram showing an example of a previously processed difference image to which an HSV filter adjustment has been applied. Processed inverted difference image 2200 comprises processed difference image 2100 of FIG. 21 after an HSV filter adjustment has been applied to it. The HSV filter has emphasized the color of the lenses of the glasses in processed difference image 2100 of FIG. 21. For example, processed inverted difference image 2200 comprises the result of step 812 of process 800 of FIG. 8.

In some embodiments, processed inverted difference image 2200 is also considered as the shadow transform corresponding to user image 900 of FIG. 9.

Figure 23:
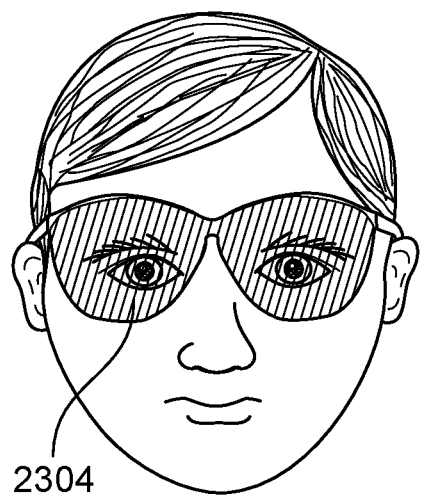
FIG. 23 is a diagram showing an example of an image of a user's face to which a corresponding shadow transform has been applied.

FIG. 23 is a diagram showing an example of an image of a user's face to which a corresponding shadow transform has been applied. An image to which a corresponding shadow transform has been applied is also sometimes referred to as a shadowed image. Shadowed image 2300 is generated by multiplying user image 900 of FIG. 9 with its corresponding shadow transform, processed inverted difference image 2200 of FIG. 22. As shown in the example, shadowed image 2300 still preserves the original facial features (e.g., eye details) of the original image, user image 900 of FIG. 9, but also appears to include shadows (to varying degrees and in various colors, if appropriate) casted by a pair of glasses as if the user were actually wearing the glasses. For example, the pixel values of the shadow transform, processed inverted difference image 2200 of FIG. 22, are scaled down to values from 0 to 1 and then multiplied with the RGB channels of corresponding pixels of the original image, user image 900 of FIG. 9. Shadowed image 2300 comprises the original image of the user's face, user image 900 of FIG. 9, with the added glasses shadows 2304 of the shadow transform, processed inverted difference image 2200 of FIG. 22.

FIG. 24 is a diagram showing an example presentation of a shadowed image with a 2D glasses image overlay. In the event that a shadowed image such as shadowed image 2300 of FIG. 23 is to be presented during a playback or a virtual glasses try-on at a user interface, the shadowed image is displayed with an overlay of a 2D glasses image. In various embodiments, the 2D glasses image that is overlaid over a shadowed image matches the orientation of the user's face in that shadowed image. In the example of FIG. 24, displayed shadowed image 2400 may comprise a portion of a glasses virtual try-on playback at a user interface. Displayed shadowed image 2400 comprises shadowed image 2300 of FIG. 23 displayed beneath or rather overlaid with displayed 2D glasses image 2402. For example, 2D glasses image 2402 may be generated by transforming 3D glasses model 1502 of FIG. 15 using the set of extrinsic information corresponding to user image 900 of FIG. 9 and projecting the transformed 3D glasses model onto a 2D surface of the focal plane of a camera using a set of intrinsic information associated with the camera.

As shown in the example, glasses shadows 2404 rendered for 2D glasses image 2402 are visible on the user's face so as to emulate the shadows that would be casted by a pair of sunglasses (or regular glasses) if the user had worn them in real life. Hence, displayed shadowed image 2400 not only presents a 2D image of a pair of glasses in the same orientation as the user's face but also realistic shadows that are to appear to be casted by those glasses on the user's face to give a high-quality virtual glasses try-on experience. As described above, because glasses shadows 2404 was rendered using a 3D generic face model and then applied to an actual image of a user's face, the glasses shadow effect can be quickly realized.

While FIGS. 9 through 24 describe an example of rendering glasses shadows on only one image of a user's face, the same process may be applied to various different images of the user's face (at different orientations) such that a user may interact (e.g., using a cursor or a touchscreen) with a playback of images at a user interface to view different user images displayed with images of glasses and their corresponding simulated shadows.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor; and
a memory coupled with the processor, wherein the memory is configured to provide the processor with instructions which when executed cause the processor to:
generate a face image corresponding to an image of a set of images based at least in part on a face model, wherein the set of images is associated with a user's face, wherein the generating of the face image corresponding to the image of the set of images comprises to transform the face model using a set of extrinsic information corresponding to the image;
generate a face with shadows image corresponding to the image based at least in part on shadows casted by a glasses model on the face model;
generate a shadow transform based at least in part on a difference determined based at least in part on the face image and the face with shadows image, comprises to:
generate a difference image by subtracting the face image from the face with shadows image;
invert colors associated with the difference image to obtain an inverted difference image; and
determine the inverted difference image as the shadow transform;
generate a shadowed image based at least in part on applying the shadow transform to the image; and
present the shadowed image including by overlaying a glasses image associated with the glasses model over the shadowed image.

2. The system of claim 1, wherein the processor is further configured to:
obtain a three-dimensional (3D) model associated with the user's face; and
generate a modified 3D generic face model by modifying a 3D generic face model to match the 3D model associated with the user's face, wherein the face model comprises the modified 3D generic face model.

3. The system of claim 2, wherein the 3D model associated with the user's face is determined from the set of images associated with the user's face.

4. The system of claim 1, wherein to generate the face with shadows image corresponding to the image based at least in part on shadows casted by the glasses model on the face model comprises to:
transform the glasses model using the set of extrinsic information corresponding to the image;
generate a combination of the transformed face model with the transformed glasses model; and
apply a lighting model to the combination to cause the transformed glasses model to cast shadows onto the transformed face model.

5. The system of claim 4, wherein the lighting model is determined based at least in part on the set of images associated with the user's face.

6. The system of claim 1, wherein to generate the shadow transform further comprises to apply a Despeckle filter to the inverted difference image.

7. The system of claim 1, wherein to generate the shadow transform further comprises to apply a blur filter to the inverted difference image.

8. The system of claim 1, wherein to generate the shadow transform further comprises to apply a Red Green Blue (RGB) curves filter to the inverted difference image.

9. The system of claim 1, wherein to generate the shadow transform further comprises to apply a Hue Saturation Value (HSV) filter adjustment to the inverted difference image.

10. The system of claim 1, wherein to generate the shadowed image based at least in part on applying the shadow transform to the image comprises multiplying the image with the shadow transform.

11. The system of claim 1, wherein the glasses model is associated with a pair of glasses selected by a user.

12. A method, comprising:
generating a face image corresponding to an image of a set of images based at least in part on a face model, wherein the set of images is associated with a user's face, wherein the generating of the face image corresponding to the image of the set of images comprises transforming the face model using a set of extrinsic information corresponding to the image;
generating a face with shadows image corresponding to the image based at least in part on shadows casted by a glasses model on the face model;
generating, using a processor, a shadow transform based at least in part on a difference determined based at least in part on the face image and the face with shadows image, comprising:

generating a difference image by subtracting the face image from the face with shadows image;
inverting colors associated with the difference image to obtain an inverted difference image; and
determining the inverted difference image as the shadow transform;
generating a shadowed image based at least in part on applying the shadow transform to the image; and
presenting the shadowed image including by overlaying a glasses image associated with the glasses model over the shadowed image.

13. The method of claim 12, further comprising:
obtaining a three-dimensional (3D) model associated with the user's face; and
generating a modified 3D generic face model by modifying a 3D generic face model to match the 3D model associated with the user's face, wherein the face model comprises the modified 3D generic face model.

14. The method of claim 13, wherein the 3D model associated with the user's face is determined from the set of images associated with the user's face.

15. The method of claim 12, wherein generating the face with shadows image corresponding to the image based at least in part on shadows casted by the glasses model on the face model comprises:
transforming the glasses model using the set of extrinsic information corresponding to the image;
generating a combination of the transformed face model with the transformed glasses model; and
applying a lighting model to the combination to cause the transformed glasses model to cast shadows onto the transformed face model.

16. A computer program product, the computer program product being embodied in a non-transitory computer-readable storage medium and comprising computer instructions for:
generating a face image corresponding to an image of a set of images based at least in part on a face model, wherein the set of images is associated with a user's face, wherein the generating of the face image corresponding to the image of the set of images comprises transforming the face model using a set of extrinsic information corresponding to the image;
generating a face with shadows image corresponding to the image based at least in part on shadows casted by a glasses model on the face model;
generating a shadow transform based at least in part on a difference determined based at least in part on the face image and the face with shadows image, comprising:
generating a difference image by subtracting the face image from the face with shadows image;
inverting colors associated with the difference image to obtain an inverted difference image; and
determining the inverted difference image as the shadow transform;
generating a shadowed image based at least in part on applying the shadow transform to the image; and
presenting the shadowed image including by overlaying a glasses image associated with the glasses model over the shadowed image.

* * * * *